US011129171B2

(12) United States Patent
Hmimy

(10) Patent No.: US 11,129,171 B2
(45) Date of Patent: Sep. 21, 2021

(54) METHODS AND APPARATUS FOR WIRELESS SIGNAL MAXIMIZATION AND MANAGEMENT IN A QUASI-LICENSED WIRELESS SYSTEM

(71) Applicant: Charter Communications Operating, LLC

(72) Inventor: Hossam Hmimy, Aurora, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 13 days.

(21) Appl. No.: 16/287,385

(22) Filed: Feb. 27, 2019

(65) Prior Publication Data
US 2020/0275457 A1 Aug. 27, 2020

(51) Int. Cl.
*H04W 4/00* (2018.01)
*H04W 72/12* (2009.01)
(Continued)

(52) U.S. Cl.
CPC .......... *H04W 72/12* (2013.01); *H04B 7/0413* (2013.01); *H04W 72/048* (2013.01); *H04W 72/0453* (2013.01)

(58) Field of Classification Search
CPC ............. H04W 72/12; H04W 72/0453; H04W 72/048; H04W 72/1226; H04B 7/0413; H04B 7/088; H04B 7/0695; Y02D 30/70
(Continued)

(56) References Cited

U.S. PATENT DOCUMENTS 5,995,499 A 11/1999 Hottinen et al.
6,154,648 A 11/2000 Comer
(Continued)

OTHER PUBLICATIONS

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
(Continued)

*Primary Examiner* — Mang Hang Yeung
(74) *Attorney, Agent, or Firm* — Gazdzinski & Associates, PC

(57) ABSTRACT

Methods and apparatus for managing radio device transmitters, beams, and receivers within a power-limited system. In one embodiment, the methods and apparatus utilize so-called "quasi-licensed" CBRS (Citizens Broadband Radio Service) wireless spectrum in conjunction with a distributed controller architecture that dynamically allocates frequency, base station, and transmit/receive beam resources for delivery of services to a number of installed fixed wireless apparatus (FWA) at user or subscriber premises. The FWA include radio path controller logic that obtains signal data via its antennae and radio head, and transmits the data to a network centralized controller that determines the resource allocation and timing (e.g., via a slotted TDD medium) for service delivery to each FWA. As such, the base stations do not determine the allocations as in the prior art, and multiple power-limited base stations can transmit signals to a single FWA to achieve greater coverage area and/or receive aggregated power.

20 Claims, 21 Drawing Sheets

(51) Int. Cl.
*H04B 7/0413* (2017.01)
*H04W 72/04* (2009.01)

(58) Field of Classification Search
USPC .......................................................... 370/329
See application file for complete search history.

(56) References Cited

U.S. PATENT DOCUMENTS

| | | | |
|---|---|---|---|
| 6,356,560 B1 | 3/2002 | Venters et al. | |
| 8,997,136 B2 | 3/2015 | Brooks et al. | |
| 9,258,809 B2 * | 2/2016 | Liao .................... | H04L 5/0035 |
| 9,386,496 B2 | 7/2016 | Gupta et al. | |
| 9,526,056 B2 | 12/2016 | Tomici et al. | |
| 9,699,663 B1 | 7/2017 | Jovancevic | |
| 9,769,692 B2 | 9/2017 | Freda et al. | |
| 9,807,778 B2 | 10/2017 | Ma et al. | |
| 9,813,148 B2 | 11/2017 | Syed et al. | |
| 1,013,573 A1 | 11/2018 | Chou | |
| 10,405,192 B2 | 9/2019 | Kakinada et al. | |
| 1,048,487 A1 | 11/2019 | Shah et al. | |
| 1,049,220 A1 | 11/2019 | Kakinada et al. | |
| 1,050,645 A1 | 12/2019 | Lou et al. | |
| 1,053,685 A1 | 1/2020 | Gunasekara et al. | |
| 1,068,088 A1 | 6/2020 | Hall et al. | |
| 1,080,556 A1 | 10/2020 | Nakamura et al. | |
| 2004/0001021 A1 | 1/2004 | Choo et al. | |
| 2006/0188004 A1 | 8/2006 | Kizu et al. | |
| 2008/0097913 A1 | 4/2008 | Dicks et al. | |
| 2008/0220788 A1 | 9/2008 | Stanwood et al. | |
| 2009/0034443 A1 | 2/2009 | Walker et al. | |
| 2010/0094956 A1 | 4/2010 | Zuckerman et al. | |
| 2011/0014924 A1 | 1/2011 | Hwang et al. | |
| 2013/0122903 A1 * | 5/2013 | Farnsworth .......... | H04W 24/02 |
| | | | 455/434 |
| 2013/0281092 A1 | 10/2013 | Gassend | |
| 2013/0288675 A1 | 10/2013 | Gassend | |
| 2013/0315124 A1 | 11/2013 | Rapaport et al. | |
| 2013/0336175 A1 | 12/2013 | Um et al. | |
| 2014/0106672 A1 | 4/2014 | Jeon et al. | |
| 2014/0194068 A1 | 7/2014 | Coppage et al. | |
| 2014/0269526 A1 | 9/2014 | Mitola, III | |
| 2014/0308986 A1 | 10/2014 | Yang et al. | |
| 2015/0055623 A1 | 2/2015 | Li et al. | |
| 2015/0071239 A1 | 3/2015 | Zhang et al. | |
| 2015/0208262 A1 | 7/2015 | Siomina | |
| 2015/0280847 A1 | 10/2015 | Somasundaram et al. | |
| 2016/0007147 A1 | 1/2016 | Zhang et al. | |
| 2016/0073259 A1 | 3/2016 | Lee et al. | |
| 2016/0165066 A1 | 6/2016 | Yang et al. | |
| 2016/0212031 A1 | 7/2016 | Jain et al. | |
| 2016/0234746 A1 | 8/2016 | Gopal et al. | |
| 2016/0330743 A1 | 11/2016 | Das et al. | |
| 2016/0381600 A1 | 12/2016 | Aksu | |
| 2017/0155703 A1 | 6/2017 | Hao et al. | |
| 2017/0208540 A1 | 7/2017 | Egner et al. | |
| 2017/0295578 A1 | 10/2017 | Khoshnevisan et al. | |
| 2017/0303138 A1 | 10/2017 | Barmettler et al. | |
| 2017/0318472 A1 | 11/2017 | Yu et al. | |
| 2018/0007587 A1 | 1/2018 | Feldman et al. | |
| 2018/0115903 A1 | 4/2018 | Badic et al. | |
| 2018/0124613 A1 | 5/2018 | Kang et al. | |
| 2018/0132112 A1 | 5/2018 | Khoshnevisan et al. | |
| 2018/0146058 A1 | 5/2018 | Somayazulu et al. | |
| 2018/0146408 A1 | 5/2018 | Meylan et al. | |
| 2018/0167948 A1 | 6/2018 | Egner et al. | |
| 2018/0199214 A1 | 7/2018 | Shen | |
| 2018/0234403 A1 | 8/2018 | Casella et al. | |
| 2018/0235007 A1 | 8/2018 | Gou et al. | |
| 2018/0242184 A1 | 8/2018 | Yerramalli et al. | |
| 2018/0255576 A1 | 9/2018 | Bhorkar et al. | |
| 2018/0279212 A1 | 9/2018 | Malik et al. | |
| 2018/0316563 A1 | 11/2018 | Kumar et al. | |
| 2018/0352386 A1 | 12/2018 | Gunasekara et al. | |
| 2019/0021012 A1 | 1/2019 | Beck et al. | |
| 2019/0028182 A1 * | 1/2019 | Smyth .................... | H04W 16/20 |
| 2019/0081690 A1 | 3/2019 | Mueck et al. | |
| 2019/0082447 A1 | 3/2019 | Harsha et al. | |
| 2019/0098510 A1 | 3/2019 | Guo et al. | |
| 2019/0098632 A1 | 3/2019 | Martin et al. | |
| 2019/0104551 A1 | 4/2019 | Deenoo et al. | |
| 2019/0115950 A1 | 4/2019 | Kakinada et al. | |
| 2019/0150182 A1 | 5/2019 | Koorapaty et al. | |
| 2019/0182895 A1 | 6/2019 | Di Girolamo et al. | |
| 2019/0230613 A1 | 7/2019 | Kim et al. | |
| 2019/0239190 A1 | 8/2019 | Patel et al. | |
| 2019/0320490 A1 | 10/2019 | Liu et al. | |
| 2019/0364565 A1 | 11/2019 | Hmimy et al. | |
| 2019/0373615 A1 | 12/2019 | Cimpu et al. | |
| 2019/0394790 A1 | 12/2019 | Damnjanovic et al. | |
| 2020/0021689 A1 | 1/2020 | Sultana et al. | |
| 2020/0053545 A1 * | 2/2020 | Wong .................... | H04W 48/18 |
| 2020/0187150 A1 | 6/2020 | Eisner | |
| 2021/0051653 A1 | 2/2021 | Park et al. | |
| 2021/0127423 A1 | 4/2021 | Park et al. | |
| 2021/0204322 A1 | 7/2021 | Lou et al. | |

OTHER PUBLICATIONS

"W-Fi Peer-to-Peer (P2P) Specification", Version 1.5, 2014, Wi-Fi Alliance, 90 pages.
"Internet Protocol, DARPA Internet Program, Protocol Specification", IETF RCF 791, Sep. 1981, 50 pages.
Deering, S., et al., "Internet Protocol, Version 6 (IPv6) Specification", Internet Engineering Task Force (IETF) RFC 2460, Dec. 1998, 39 pages.
Banerji S., et al., "On IEEE 802.11: Wireless LAN Technology", vol. 3 (4), 2013, 19 pages.
Kadir E.A., et al., "Performance Analysis of Wireless LAN 802.11 Standard for e-Learning", 2016 International Conference on Information and Communication Technology, 6 pages.
Souryal, Michael R., et al., "Effect of Federal Incumbent Activity on CBRS Commercial Service", International Symposium on Dynamic Spectrum Access Networks (DySPAN), IEEE 2019, 5 pages.

* cited by examiner

METHODS AND APPARATUS FOR WIRELESS SIGNAL MAXIMIZATION AND MANAGEMENT IN A QUASI-LICENSED WIRELESS SYSTEM

RELATED APPLICATIONS

The subject matter of this application is generally related to co-owned and co-pending U.S. patent application Ser. No. 15/902,833 filed Feb. 22, 2018 and entitled "METHODS AND APPARATUS FOR ALLOCATION AND RECONCILIATION OF QUASI-LICENSED WIRELESS SPECTRUM ACROSS MULTIPLE ENTITIES," which claims priority to U.S. Provisional Patent Application Ser. No. 62/617,549 filed Jan. 15, 2018 of the same title, as well as U.S. patent application Ser. No. 15/677,940 filed Aug. 15, 2017 and entitled "METHODS AND APPARATUS FOR DYNAMIC CONTROL AND UTILIZATION OF QUASI-LICENSED WIRELESS SPECTRUM", as well as Ser. No. 15/785,283 filed Oct. 16, 2017 and entitled "METHODS AND APPARATUS FOR COORDINATED UTILIZATION OF QUASI-LICENSED WIRELESS SPECTRUM," and Ser. No. 15/814,133 filed Nov. 15, 2017 and entitled "METHODS AND APPARATUS FOR UTILIZATION OF QUASI-LICENSED WIRELESS SPECTRUM FOR IOT (INTERNET-OF-THINGS) SERVICES," each of the foregoing incorporated herein by reference in its entirety. The subject matter of this application is also generally related to the subject matter of U.S. patent application Ser. No. 15/986,614 entitled "METHODS AND APPARATUS FOR INTRA-CELL AND INTER-FREQUENCY MOBILITY OPTIMIZATION AND MITIGATION OF SESSION DISRUPTION IN A QUASI-LICENSED WIRELESS SYSTEM" filed May 22, 2018, and Provisional Application Ser. No. 62/799,454 filed Jan. 31, 2019 and entitled "METHODS AND APPARATUS FOR FREQUENCY TRANSITION MANAGEMENT IN A QUASI-LICENSED WIRELESS SYSTEM," each incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for aggregating signals from multiple transmitter devices utilizing radio frequency spectrum to provide high-speed data services, such as for example those providing connectivity via quasi-licensed Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |

TABLE 2-continued

| Frequency range | Type | Center frequency | Availability | Licensed users |
|---|---|---|---|---|
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2*a*.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m.

Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unaddressed Issues of Restricted Maximum Power and Performance—

Extant CBRS architectures, while promising from the standpoint of reduced contention for spectrum, currently lack mechanisms for obtaining maximal power at a given Consumer Premises Equipment (CPE) such as a premises Fixed Wireless Access (FWA) device. In particular, in the extant CBRS ecosystem, many devices including higher-power CBSD and outdoor FWA devices functioning as CPE are treated or classified as CBSD Category B devices. As previously noted, Category A devices can transmit up 30 dbm (1 watt)/10 MHz, while Category B devices can transmit up to about 50 dbm/10 MHz, so the average coverage area for a Category B device (and its data rate) are limited. In practical terms, a Category B device may operate out to thousands of feet or more, the propagation and working range dictated by a number of factors, including the presence of RF or other interferers, physical topology of the venue/area, energy detection or sensitivity of the receiver, etc.

However, on an individual transmitter basis, even the foregoing Category B devices are, in comparison to e.g., cellular systems, limited in data throughput and area coverage. Specifically, to provide a high level of performance and greater coverage area, a single base station (e.g., CBSD/xNB) serving the CPE/FWA device has to transmit on comparatively higher power; accordingly, the received Signal-to-Noise Ratio (SNR) and interference ratio is sufficiently high for greater data throughput (using e.g., 256 QAM, 512 QAM and beyond). However, such higher power will violate the Category B EIRP limits enforced in the CBRS system.

Other related techniques known in the prior art for increasing usable power at a receiving device include: (i) use of a high device antenna gain; (ii) use of multiple receive antennas for receive diversity from a single transmitter; and (iii) use of multiple receive antennas for receive diversity from multiple distributed transmitters. Notably, under prior art schemes (see for example the architecture 200 of FIG. 2*b*), the transmitting base station (e.g., CBSD/eNB 206*a-c*) or its support system is controlling the recipient or served devices (CPE/FWA 230, or UE not shown), and hence is responsible for directing the served device 230 as to which CBSD/xNB 206*a-c* to connect with. The served device receives the signal (direct or multipath) 222 from the CBSD/xNB that is controlling it (in this case CBSD/eNB 2 206*b*) and whose coverage area 201 the CPE/FWA 230 is within, and effectively treats the other signals 224, 226 from other CBSD/xNBs 206*a*, 206*c* whose coverage areas 208, 212 the CPE/FWA is within as noise. This is non-optimal for restricted lower power systems such as CBRS, since much of what could feasibly be useful transmitted power is wasted, thereby effectively limiting the maximum data rates that can be achieved under such prior art approaches.

Hence, to achieve (i) maximal data rates for CBRS or other systems with comparatively low maximum EIRP values for transmitting components, and (ii) wider area coverage for a fixed number of such transmitters, a better solution is needed.

SUMMARY

The present disclosure addresses the foregoing needs by providing, inter alia, methods and apparatus for providing maximum delivered power and data rates for, inter alia, served CPE such as FWA devices.

In a first aspect of the disclosure, a method of operating a wireless network infrastructure comprising a fixed wireless receiver and at least two base stations is disclosed. In one embodiment, the method includes receiving at least two signals at the fixed wireless receiver, the at least two signals transmitted by respective ones of the at least two base stations and corresponding to a common data stream, and utilizing the at least two signals to obtain the common data stream for use by a premises device in data communication with the fixed wireless receiver.

In one variant, the at least two signals are transmitted within a frequency range between 3.550 and 3.70 GHz inclusive, and the at least two base stations comprise CBRS (Citizens Broadband Radio Service) compliant CBSDs (Citizens Broadband radio Service Devices).

In one implementation, the method further includes: detecting, via the fixed wireless receiver, the at least two signals; evaluating the detected at least two signals to generate data relating to the at least two signals; and transmitting the generated data to at least one network controller in data communication with the at least two base stations, the transmitted generated data being useful in the at least one network controller in scheduling the transmission of the at least two signals. The evaluating the detected at least two signals to generate data relating to the at least two signals includes for example evaluating the detected at least two signals as to signal strength and direction.

In another variant, the method further includes detecting, via the fixed wireless receiver, the at least two signals; evaluating the detected at least two signals to generate data relating to the at least two signals; and transmitting the generated data to at least one network controller in data communication with the at least two base stations, the transmitted generated data being useful in the at least one network controller in scheduling the transmission of the at least two signals.

In yet another variant, the method further includes: detecting, via the fixed wireless receiver, at least the at least two signals; evaluating the detected at least two signals to generate data relating to the at least two signals; and transmitting the generated data to at least one network controller in data communication with the three or more base stations, the transmitted generated data being useful in the at least one network controller in selecting a subset of multiple input multiple output (MIMO) antenna elements associated with each of the at least two base stations for subsequent delivery of the common data stream.

In still another variant, the transmitting the generated data to at least one network controller in data communication with the at least two base stations comprises transmitting the generated data in one or more data bursts via a then-best reverse channel between the fixed wireless receiver and one of the at least two base stations.

In another aspect of the disclosure, a network architecture for delivery of wireless data to at least one fixed wireless receiver apparatus is disclosed. In one embodiment, the network architecture includes: a plurality of wireless base stations; a computerized network controller in data communication with the plurality of base stations; at least one fixed wireless receiver apparatus; and a computerized premises controller in data communication with the at least one fixed wireless receiver and the computerized network controller.

In one variant, the computerized network controller and the computerized premises controller are configured to communicate data to enable selection of two or more of the plurality of wireless base stations for delivery of at least portions of a data stream to the at least one fixed wireless receiver apparatus.

In one implementation, the plurality of base stations each comprise a plurality of multiple input, multiple output (MIMO) antenna elements; and the computerized network controller and the computerized premises controller are further configured to communicate data to enable selection of individual ones of transmit beams formed by the plurality of MIMO antenna elements for each of the two or more of the plurality of wireless base stations for delivery of at least portions of a data stream to the at least one fixed wireless receiver apparatus. The plurality of base stations are in once scenario each limited to a common value of maximum EIRP (Equivalent Isotropic Radiated Power), and the fixed wireless receiver apparatus comprises computerized logic configured to enable utilization of received ones of the transmit beams carrying the at least portions of the data stream so as to achieve an aggregated received power value higher than that achievable by a single base station transmitting at the maximum EIRP.

In another variant, the architecture includes a plurality of substantially independent network controllers that each control a plurality of base stations (e.g., CBSD/xNBs) and is in communication with local radio path controllers/reporters associated with fixed wireless apparatus (FWAs) disposed at various client premises. The network controllers are also linked to an MSO CBRS Core controller for, e.g., spectrum management and allocation, client-specific functions and data, etc.

In a further aspect of the disclosure, a method of operating a wireless network infrastructure is disclosed. In one embodiment, the infrastructure includes a plurality of fixed wireless receivers each disposed at different physical locations and a plurality of base stations, each of the plurality of base stations having a plurality of independent radio frequency (RF) transmit beams, the method includes: transmitting at least two signals to each of the fixed wireless receivers, the at least two signals transmitted to each of the fixed wireless receivers transmitted by respective ones of different combinations of (i) the plurality of base stations and (ii) the plurality of independent radio frequency (RF) transmit beams of each of the plurality of base stations, the at least two signals received by each of the fixed wireless receivers corresponding to a common data stream to be delivered to that fixed wireless receivers, the at least two signals transmitted to each of the fixed wireless receivers being transmitted within one or more temporal periods allocated to the respective fixed wireless receiver; receiving the transmitted at least two signals at each of the fixed wireless receivers; and combining the respective received transmitted at least two signals at each of the fixed wireless receivers to generate respective ones of the common data streams for use by the respective fixed wireless receiver.

In a further aspect, a network controller is disclosed. In one embodiment, the network controller includes both control logic and scheduling logic for evaluating data sent from CPE/FWA disposed at various client premises, and determining optimal base station (e.g., CBSD/xNB), beam, frequency and TDD slot assignments for each CPE/FWA.

In another aspect, a wireless transmitter is disclosed that includes a CBRS (Citizens Broadband Radio Service)-compliant and 3GPP compliant eNB or gNB.

In another aspect, a wireless receiver is disclosed that includes a CBRS (Citizens Broadband Radio Service)-compliant FWA that is capable of data communication with the 3GPP compliant eNB or gNB. In one variant, the FWA includes radio path controller logic for, inter alia, generating signal report data and transmitting it to the network controller.

In one variant, the FWA apparatus comprises a premises device operated by a network operator (e.g., MSO) that is configured to communicate wirelessly with one or more CBSD/xNB devices to obtain high-speed data services and wireless backhaul from the premises. In one variant, the FWA apparatus is configured as a Category B CBSD CBRS device, and is mounted on the user's premises so as to enable the aforementioned backhaul for WLAN or wireline interfaces within the premises.

In an additional aspect of the disclosure, computer readable apparatus is described. In one embodiment, the apparatus includes a storage medium configured to store one or more computer programs, such as on a CPE-associated controller or network controller of a CBRS network. In one embodiment, the apparatus includes a program memory or HDD or SDD on a computerized controller device, such as an MSO controller/scheduler, DP, or SAS entity. In another embodiment, the apparatus includes a program memory, HDD or SSD on a computerized wireless access node (e.g., CBSD/xNB). In yet another embodiment, the apparatus is part of a CPE/FWA device and its local radio path controller.

In a further aspect, a system architecture for delivery of wireless signals via unlicensed or quasi-licensed spectrum from a plurality of CBSD/xNB to one or more associated CPE is disclosed.

In another aspect, methods and apparatus for inter-controller coordination for delivery/receipt of wireless signals to/from one or more target CPE are disclosed. In one embodiment, the inter-controller coordination comprises data messaging between two or more controllers relating to CBSD signal/beam reports from a target CPE such that CBSDs/beams associated with different controllers may be used to provide services to a common CPE.

These and other aspects shall become apparent when considered in light of the disclosure provided herein.

Figure 1:
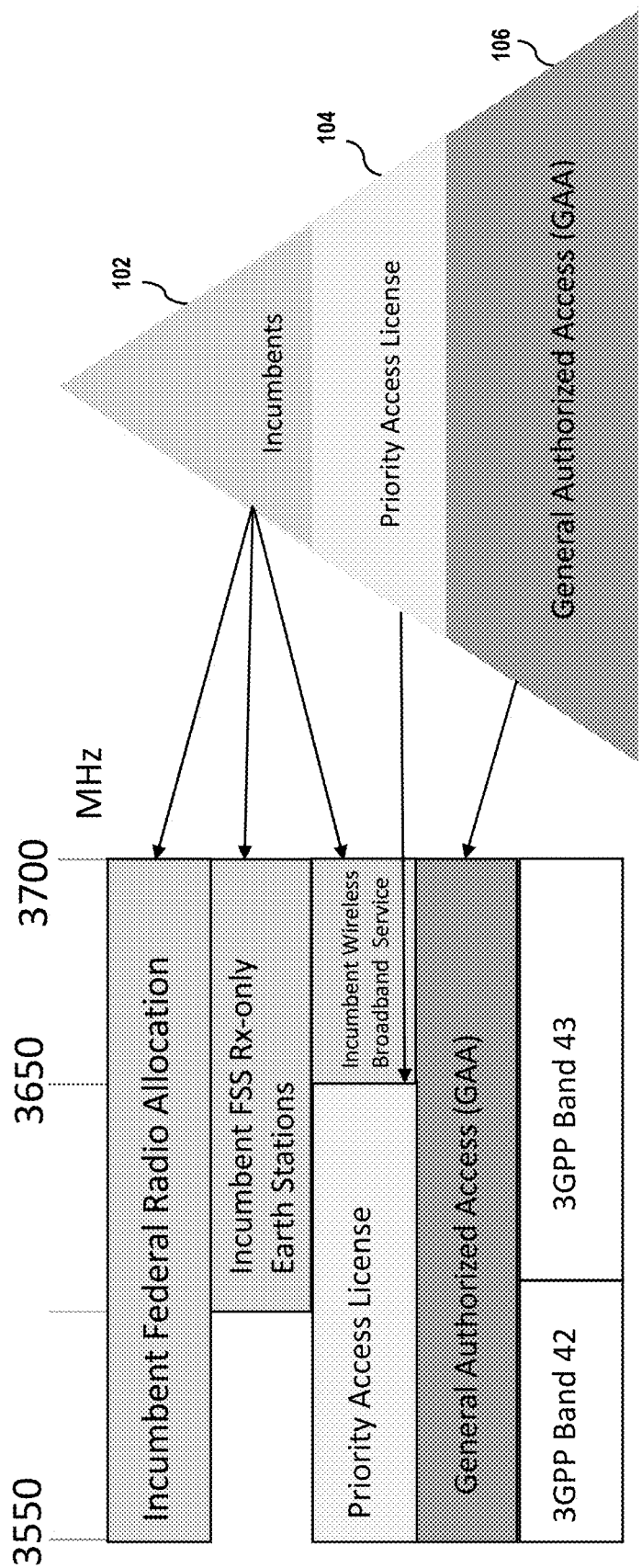
FIG. 1 is a graphical illustration of prior art CBRS (Citizens Broadband Radio Service) users and their relationship to allocated frequency spectrum in the 3.550 to 3.700 GHz band.

All figures © Copyright 2017-2019 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

Methods and apparatus for managing radio device transmitters, beams, and receivers within a power-limited system so that maximal area coverage and/or data rates can be achieved. In one embodiment, the methods and apparatus utilize so-called "quasi-licensed" CBRS (Citizens Broadband Radio Service) wireless spectrum in conjunction with a distributed controller architecture that dynamically allocates frequency, base station, and transmit/receive beam resources for delivery of services to a number of installed fixed wireless apparatus (FWA) at user or subscriber premises.

The FWA include radio path controller logic that obtains signal data via its antenna elements and radio head, and transmits the data to a network or centralized controller that determines the resource allocation and timing (e.g., via a slotted TDD medium) for service delivery to each FWA.

As such, the base stations (e.g., CBSD/xNBs) do not determine the allocations as in the prior art, and multiple power-limited base stations can transmit signals to a single FWA such that greater coverage area and/or receive aggregated power are achieved.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Moreover, while some aspects of the present disclosure are described in detail with respect to so-called "4G/4.5G" 3GPP Standards (aka LTE/LTE-A) and so-called 5G "New Radio" (3GPP Release 15 and TS 38.XXX Series Standards and beyond), such aspects—including allocation/use/withdrawal of CBRS spectrum—are generally access technology "agnostic" and hence may be used across different access technologies, and can be applied to, inter alia, any type of P2MP (point-to-multipoint) or MP2P (multipoint-to-point) technology.

Other features and advantages of the present disclosure will immediately be recognized by persons of ordinary skill in the art with reference to the attached drawings and detailed description of exemplary embodiments as given below.

Service Provider Network—

Figure 3A:
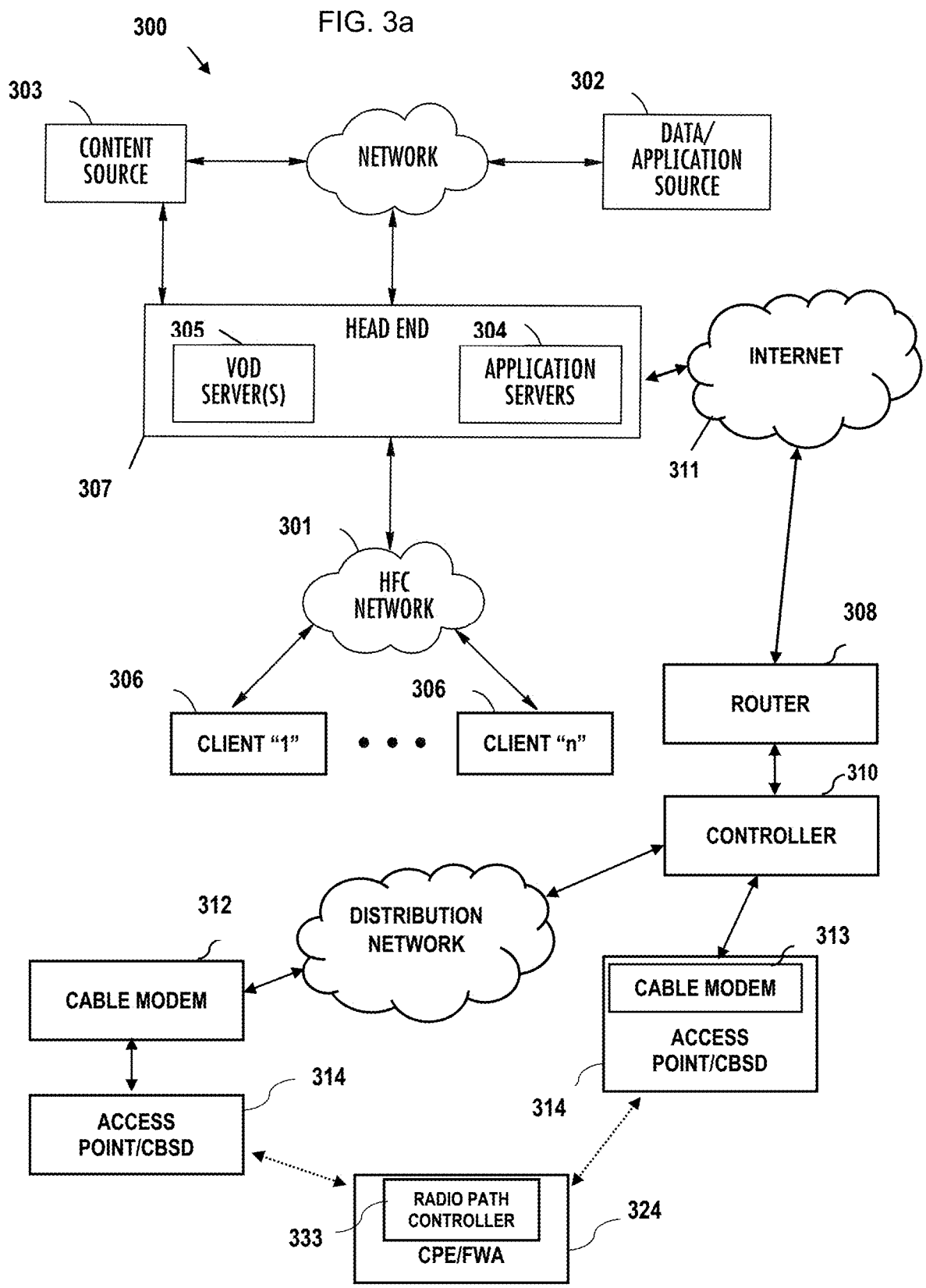
FIG. 3a is a functional block diagram illustrating an exemplary hybrid fiber network configuration useful with various aspects of the present disclosure.

FIG. 3a illustrates a typical service provider network configuration useful with the spectrum re-assignment functionality and supporting CBRS-based wireless network(s) described herein. It will be appreciated that while described with respect to such network configuration, the spectrum reassignment methods and apparatus described herein may readily be used with other network types and topologies, whether wired or wireless, managed or unmanaged.

The exemplary service provider network 300 is used in one embodiment of the disclosure to provide backbone and Internet access from the service provider's wireless access nodes (e.g., CBSD/xNBs, Wi-Fi APs, FWA devices or base stations 314 operated or maintained by the service provider or its customers/subscribers, including cases where the subscriber leases the device for use), one or more stand-alone or embedded cable modems (CMs) 312, 313 in data communication therewith, or even third party access points accessible to the service provider via, e.g., an interposed network such as the Internet 311 (e.g., with appropriate permissions from the access node owner/operator/user). As discussed in greater detail elsewhere herein, the exemplary enhanced CBSD/xNB nodes 314 include the capability of communication with served nodes such as the enhanced CPE 324 discussed infra for, inter alia, more efficient and higher bandwidth service from multiple CBSD/xNB so as to provide better end-user experience.

As described in greater detail subsequently herein with respect to FIG. 4, one or more network controllers 310 are utilized in conjunction with CPE/FWA-based controller logic 333 for, inter alia, control of the wireless network access nodes 314 at least partly by the MSO so as to optimize delivery of multiple wireless signals to the targeted CPE/FWA 324. As opposed to an unmanaged network, the managed service-provider network 300 of FIG. 3a advantageously allows, inter alia, control and management of a given user's access (such user which may be a network subscriber, or merely an incidental/opportunistic user of the service) via the wireless access node(s) 314, including imposition and/or reconfiguration of various access "rules" or other configurations applied to the wireless access nodes, as well as managing which base stations (CBSD/xNBs) will interface with which CPE/FWA.

Moreover, the integrated service provider network architecture 300 allows components at a served premises or venue of interest (e.g., CBSDs, Wi-Fi APs and any supporting infrastructure such as routers, switches, etc.) to be remotely and dynamically reconfigured by the network MSO, based on e.g., prevailing operational conditions in the network, changes in user population and/or makeup of users at the venue, business models (e.g., to maximize profitability or provide other benefits such as enhanced user experience, as described infra), spectrum channel changes or withdrawals by the SAS, or even simply to enhance user experience using one RAT (e.g., CBRS) when another RAT (e.g., WLAN is sub-optimal for whatever reason). It also permits communication of data from the CBSDs backwards towards the controller, including configuration and demand data relating to the individual CBSDs for purposes of facilitating seamless handover.

In certain embodiments, the service provider network 300 also advantageously permits the aggregation and/or analysis of subscriber- or account-specific data (including inter alia, particular CPE/FWA devices 324 associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 307 so as to permit or at least facilitate, among other things, (i) device authentication; (ii) correlation of aspects, use cases or applications to particular subscriber geographics or installation features, such as for logical grouping of CPE/FWA devices of two or more discrete subscribers (or premises thereof) for purposes of e.g., aggregation under a common "host" CBSD/xNB, radio path metrics, etc. Moreover, device profiles for particular CPE/FWA devices can be maintained by the MSO, such that the MSO (or its automated proxy processes) can model the subscriber-associated device for wireless capabilities.

The CBSD/xNB wireless access nodes 314 disposed at the service location(s) (e.g., areas, premises or venue(s) of interest) can be coupled to the bearer managed network 300 (FIG. 3a) via, e.g., a cable modem termination system (CMTS) and associated local DOCSIS cable modem (CM) 312, 313, a wireless bearer medium (e.g., an 802.16 WiMAX or millimeter wave system—not shown), a fiber-based system such as FiOS or similar, a third-party medium which the managed network operator has access to (which may include any of the foregoing), or yet other means.

The various components of the exemplary embodiment of the network 300 generally include (i) one or more data and application origination sources 302; (ii) one or more content sources 303, (iii) one or more application distribution servers 304; (iv) one or more video-on-demand (VOD) servers 305, (v) client devices 306, (vi) one or more routers 308, (vii) one or more wireless access node controllers 310 (may be placed more locally as shown or in the headend or "core" portion of network), (viii) one or more cable modems 312, 313, and/or (ix) one or more access nodes 314 (which may include 3GPP-compliant EUTRAN eNodeB and/or 5G NR gNodeB functionality as described elsewhere herein). The application server(s) 304, VOD servers 305 and client device(s) 306 are connected via a bearer (e.g., HFC) network 301. A simple architecture comprising one of each of certain components 302, 303, 304, 305, 308, 310 is shown in FIG. 3a for simplicity, although it will be recognized that comparable architectures with multiple origination sources, distribution servers, VOD servers, controllers, and/or client devices (as well as different network topologies) may be utilized consistent with the present disclosure.

It is also noted that cable network architecture is typically a "tree-and-branch" structure, and hence multiple tiered CBSD/xNB access nodes 314 (and other components) may be linked to each other or cascaded via such structure.

Figure 3B:
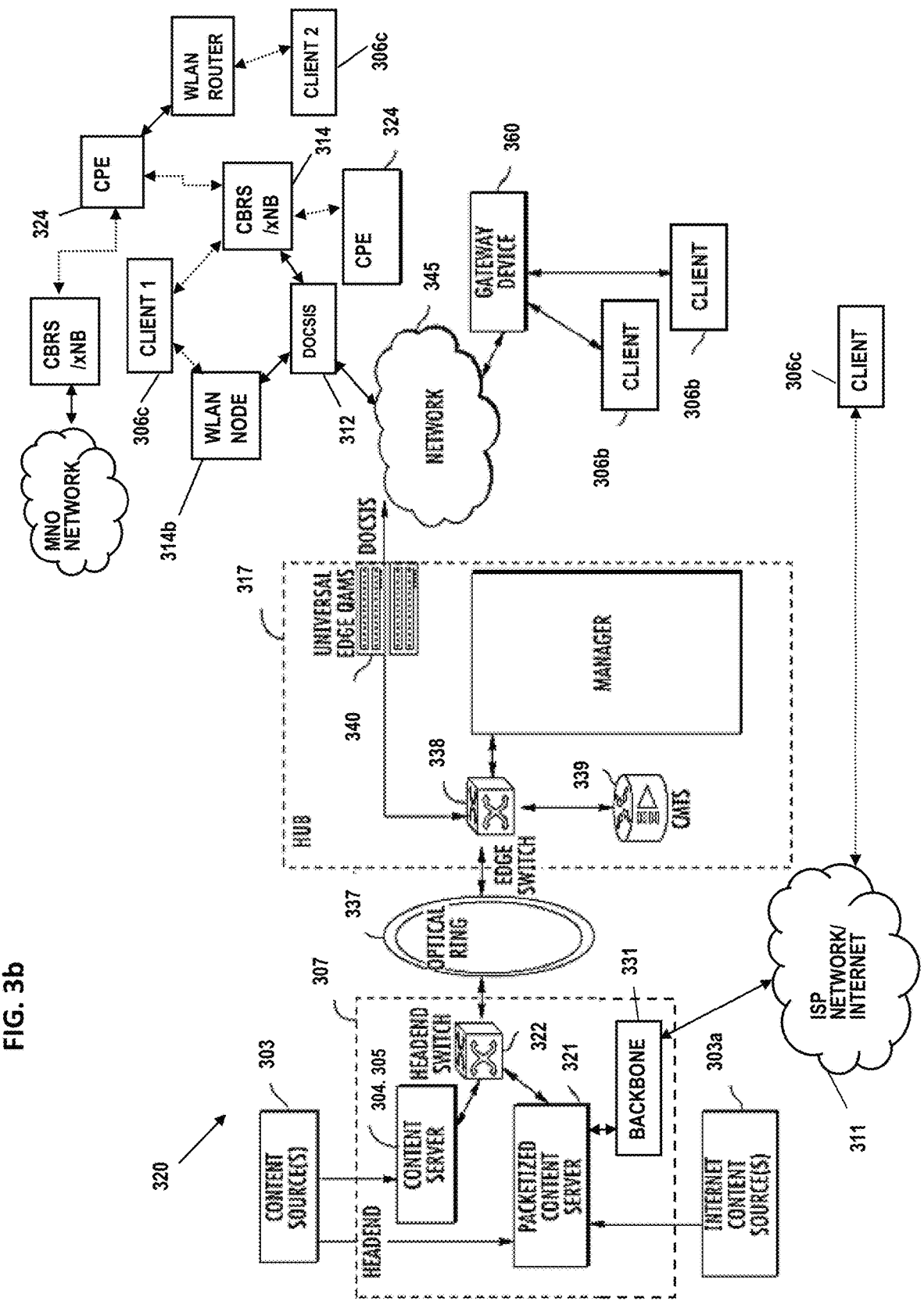
FIG. 3b is a functional block diagram of an exemplary packetized content network architecture useful in conjunction with various principles described herein.

FIG. 3b illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 3b may deliver Internet data and OTT (over-the-top) services to the end users (including those of the access nodes 314) via the Internet protocol (IP) and TCP, although other protocols and transport mechanisms of the type well known in the digital communication art may be substituted.

The network architecture 320 of FIG. 3b generally includes one or more headends 307 in communication with at least one hub 317 via an optical ring 337. The distribution hub 317 is able to provide content to various user/client devices 306, and gateway devices 360 as applicable, via an interposed network infrastructure 345. The illustrated CPE/FWA 324 includes in one implementation an outdoor Fixed Wireless Access (FWA) application of CBRS. In FWA, the CBSD/xNB communicates wirelessly with a Customer Premises Equipment (CPE) mounted on the customer's house or office (e.g., mounted rooftop, on a pole, etc.); see the outdoor portion 324a of the exemplary CPE device of FIG. 8. User devices such as 3GPP-compliant UE 306c (e.g., smartphones or other mobile devices) may also be in direct communication with the CBSD/xNB, although due to mobility, such UE are not included within the population of CPE/FWA reporting to the network controller 310 as described elsewhere herein.

Various content sources 303, 303a are used to provide content to content servers 304, 305 and origin servers 321. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 303a (such as e.g., a web server) provide Internet content to a packetized content origin server(s) 321. Other IP content may also be received at the origin server(s) 321, such as voice over IP (VoIP) and/or IPTV content. Content may also be received from subscriber and non-subscriber devices (e.g., a PC or smartphone-originated user made video).

The centralized media server(s) 321, 304 located in the headend 307 may also be replaced with or used in tandem with (e.g., as a backup) to hub media servers (not shown) in one alternative configuration. By distributing the servers to the hub stations 317, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 321, 304 may either be single-purpose/dedicated (e.g., where a given server is dedicated only to servicing certain types of requests), or alternatively multi-purpose (e.g., where a given server is capable of servicing requests from different sources).

The network architecture 320 of FIG. 3b may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 312 (including to end users of the CBSD/xNB access node 314 and CPE/FWA 324). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 312 and associated end-user devices 306a, 306b of the implementation of FIG. 3b may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 340. According to this embodiment, all of the content is delivered on DOCSIS channels, which are received by a premises gateway 360 or cable modem 312, and distributed to one or more respective client devices/UEs 306a, 306b, 306c in communication therewith.

In one implementation, the CM 312 shown in FIG. 3b services an area which may include a prescribed premises or venue, such as an apartment building, conference center or hospitality structure (e.g., hotel). In parallel (or in the alternative), the premises includes one or more CPE/FWA nodes 324 for CBRS-band (3.5 GHz) access, and a WLAN (e.g., Wi-Fi) node 314b for WLAN access (e.g., within 2.4 GHz ISM band), or a 3GPP small cell or femtocell. The CPE/FWA 324 may also provide connectivity for a WLAN router as shown (i.e., the CPE/FWA acting as a radio head for attached router which provides more localized WLAN services to portions of the premises), which provides e.g., Wi-Fi access for users at the premises. The CPE/FWA 324 may also communicate wirelessly with non-MSO CBSD/xNB devices operated by e.g., an MNO for backhaul via that MNO's infrastructure, as shown at the top of FIG. 3b. Notably, in some configurations, the client devices 306c communicating with the access nodes 314a, 314b, as described in greater detail subsequently herein, can utilize either RAT (CBRS/3GPP with the CBSD/xNB or WLAN). In one variant, this selective utilization may depend on, inter alia, directives received from the MSO controller 310 (FIG. 3a) via one access node 314 or the other, or even indigenous logic on the client device 306c enabling it to selectively access one RAT or the other. Feasibly, both RATs could operate in tandem, since they utilize different frequencies, modulation techniques, interference mitigation techniques, Tx power, etc.

In parallel with (or in place of) the foregoing delivery mechanisms, the MSO backbone 331 and other network components can be used to deliver packetized content to the user's mobile client device 306c via non-MSO networks.

For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device 306c utilizing an Internet browser or MSO/third-party app to stream content according to an HTTP-based approach).

Wireless Services Architecture—

Figure 4:
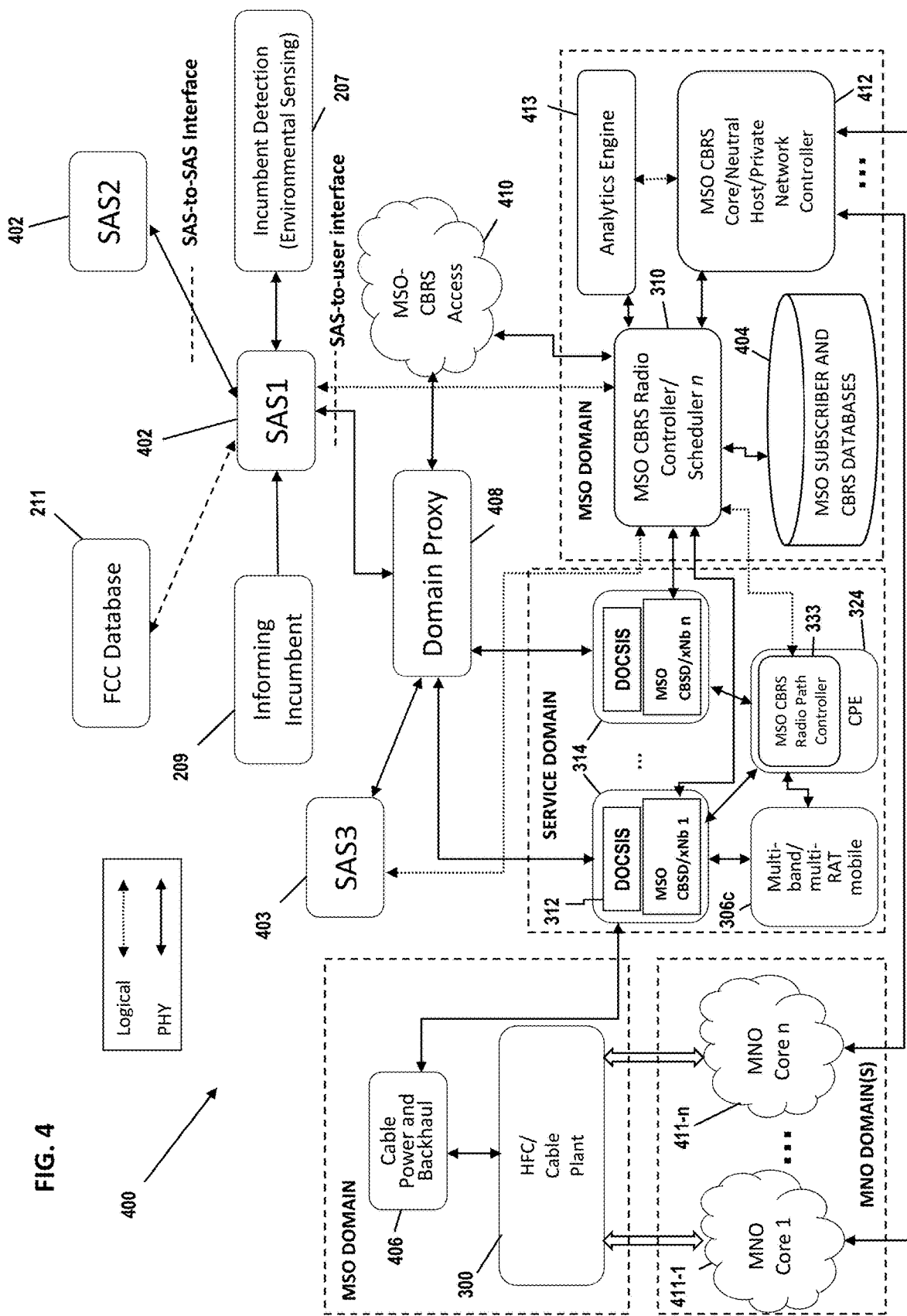
FIG. 4 is a functional block diagram of a first exemplary embodiment of a quasi-licensed wireless network infrastructure useful with various aspects of the present disclosure.

FIG. 4 illustrates an exemplary embodiment of a network architecture 400 useful in implementing the CBSD/xNB and CPE/FWA pairing and controller functionality according to the present disclosure. As used in the present context, the term "users" may include without limitation end users (e.g., individuals, whether subscribers of the MSO network, the MNO network, or other), the receiving and distribution equipment or infrastructure such as CPE/FWA 324, venue operators, third party service providers, or even entities within the MSO itself (e.g., a particular department, system or processing entity).

It will be appreciated that while described primarily in terms of CBSD/xNBs 314 which also include EUTRAN (3GPP) compliant eNodeB and/or gNodeB functionality, the latter is by no means of requirement of practicing the broader features of the invention, and in fact non-3GPP signaling and protocols may be utilized to support the various functions described herein. Due to its current ubiquity (especially in mobile devices or UEs), however, the extant 3GPP protocols provide a convenient and effective platform which can be leveraged for CBRS-based operation. Moreover, the various aspects of the disclosure are not limited to CBRS-based frequencies or infrastructure, but rather may conceivably be applied to any fixed architecture wireless system with multiple transmitters and receivers.

As shown, the illustrated embodiment of the architecture may generally include if desired an MSO-maintained CBRS controller 310 (which may be disposed remotely at the backend or headend of the system within the MSO domain as shown or at the served venue, or at an intermediary site), a CBRS Core/Neutral Host/Private Network Controller 413, an analytics engine 413 in data communication with the CBRS controller 310, an MSO-maintained subscriber and CBRS database 404, multiple CBSD/xNB access nodes 314 in data communication with the CBRS controller 310 (e.g., via existing network architectures including any wired or wireless connection), as well as any number of CPE/FWA devices 324 (with CPE radio path controller logic 333, as described in greater detail below), and other client devices 306c (smartphones, laptops, tablets, watches, vehicles, etc.). The CBSD/xNB 314 includes in the illustrated embodiment an embedded cable modem 312 used for communication with a corresponding CMTS 339 (FIG. 3b) within the MSO's (e.g., cable) plant 300 via cable power and backhaul infrastructure 406, including high-data bandwidth connections to the MSO's backbone 331, and electrical power for the CBSD/xNB. A MNO (mobile network operator) network 411 also may communicate with the MSO network via the backhaul 406, such as for inter-operator communications regarding common users/subscribers.

The presence of the MSO analytics engine 413 is optional for purposes of implementing the methodologies and functions described herein; certain analytics functions may be performed by the MSO analytics engine in support of efficient frequency management and utilization (including mitigation of session disruption due to e.g., SAS-initiated spectrum withdrawals), depending on inter alia, the degree of integration between the cognizant SAS/DP and the MSO desired. For example, in one implementation, certain sets of rules or priorities may be implemented at the MSO level via logic on the network controller 310 and analytics engine 413 which are not visible to the SAS (the SAS being largely agnostic to particulars of each MSO/MNO domain which it serves). As such, the SAS (or DP) may provide the MSO domain with higher-level instructions or directives on frequency/carrier use, reclamation, time periods, etc., and effectively let the MSO domain decide how to execute the process consistent with those instructions or directives. These instructions/directives may subsequently be utilized by the network controller 310 in evaluating and selecting frequency allocations for various CPE/FWA 324 during one or more TDD slots.

It will be appreciated that while a single network controller entity 310 is shown in FIG. 4, the architecture may in fact include two or more such controllers, each allocated (whether statically or dynamically) to a subset of the access nodes 314 of the network.

As shown in FIG. 4, in operation, the Domain Proxy (DP) 408 is in logical communication with the CBSD/xNB disposed at the premises or venue (either directly, as shown, or via MSO backend network infrastructure) and the MSO CBRS network controller entity 310. The DP 408 provides, inter alia, SAS interface for the CBSD/xNB, including directive translation between CBSD/xNB 314 and SAS commands, bulk CBSD/xNB directive processing, and interference contribution reporting to the SAS (i.e., to help an SAS tune or update its predictive propagation models and detect realistic interference issues once CBSDs/xNBs are deployed, the CBSDs/xNBs and even attached CPE/FWA 324 can provide signal strength, phase/timing, and interference level measurements, in addition to or as part of those provided to the network controller 310 as part of the CBSD/xNB/Beam/slot allocations described in greater detail elsewhere herein).

The MSO network controller entity 310 (or entities) in the illustrated embodiment communicates with the DP 208 via an MSO CBRS access network 410, which may be a public internetwork (e.g., the Internet), private network, or other, depending on any security and reliability requirements mandated by the MSO and/or SAS.

As used herein, a CBRS "domain" is defined is any collection of CBSDs/xNBs 314 that are or need to be grouped for management, whether logically or by other scheme; e.g.: according to network operator (NO), according to a serving SAS vendor, by radio path propagation characteristics, and/or by physical disposition (e.g., within a large enterprise, venues, certain geographic area, etc.) In the embodiment of FIG. 4, the DP 408 aggregate control information flows to the SAS1 402 and/or any participating other SAS (SAS2), which may be e.g., a Commercial SAS (CSAS) 403, and generates performance reports, channel requests, heartbeats, and other types of data, including data necessary for operation of the spectrum allocation and reassignment algorithms described in greater detail subsequently herein. In the illustrated embodiment, the DP 408 is operated by a third-party service provider, although it will be appreciated that the MSO may operate and maintain the DP 408, and or operate/maintain its own internal DP, such as for channel request processing, aggregation, reporting, and other of the above-listed functions for the MSO's internal CBRS domains, for interface with an external DP 408.

As previously noted, one primary attribute of the disclosure relates to its ability to enhance coverage area and/or signal strength (and data rate). Specifically, to increase the amount of power received by the end user (CPE/FWA), the CPE/FWA must receive the signal from multiple CBSD/xNBs with multiple beams (including from multipath) transmitting at e.g., maximum allowable EIRP. Unlike traditional cellular systems and technologies where the BS (e.g., eNB) maintains control of interactions with the target UE, the control in the exemplary architectures of FIGS. 3-4b herein is split between the CPE/FWA (which contains its own radio path controller logic 333) and a group of CBSD/xNBs (under common centralized control). The two controllers 333, 310 (on the CPE/FWA and centralized, respectively) communicate data with one another to determine utilization of the various CBSD/xNBs that are assigned to that given centralized controller 310 for delivery of wireless services to the target CPE/FWA as frequently as every transmission period or interval for the TDD system. It will be appreciated by those of ordinary skill given the present disclosure that the aforementioned transmission period may be as few as one, or alternatively multiple ones (whether consecutive or non-consecutive), of the minimum transmission time intervals specified within the TDD architecture.

Also notably, since the CPE/FWA 324 are all presumed to be fixed in location in the exemplary embodiments, and hence no traditional "mobility" aspects such as those involved with cellular systems need be accounted for, the functions (and functional allocation) between the various components of the network (e.g., RAN, core, etc.) and the client (here, the CPE/FWA) is more flexible in some regards. Since the physical/spatial relationships between the CPE/FWA (fixed) and CBSD/xNBs (also fixed) are known a priori, many calculations can be obviated, and barring any significant other changes in path metrics, one or more given CBSD/xNBs can be used to serve one or more given CPE/FWA devices with some degree of stability and reliability.

To the degree that a new CPE/FWA or CBSD/xNB is installed within the architecture (e.g., a new customer is added), this new installation may be characterized as to its RF propagation characteristics via install/startup testing, and the results of the characterization used to assign the new CPE/FWA to a "host" network controller 310 by virtue of the CBSD/xNBs with which the new CPE "best" communicates (as well as other factors such as controller loading).

In one implementation, the CPE/FWA radio path controller 333 and the network controller 310 are in data communication via "opportunistic" radio frequency channels between the CPE/FWA and one or more of the CBSD/xNBs 314; e.g., on the prevailing then-strongest strongest radio path(s). This data may optionally be encrypted or otherwise protected, and sent as one or more data bursts. The receiving CBSD/xNB routes the received burst data to the controller via its wireline (e.g., DOCSIS) backhaul.

In the exemplary configuration, each CBSD/xNB 314 has multiple independent beams per use of multiple spatially diverse antenna elements (see discussion of FIGS. 8-8d herein), and each has a short coded pilot signature that is transmitted in the header of the transmission period defined above. Each CPE/FWA 324 radio may include multiple antenna elements (e.g., in a MIMO configuration), and is configured to scan using beam steering (via its own multiple antenna elements), and report on wireless signals received from each CBSD/xNB 314a-314c (see FIGS. 5-5b) and each corresponding independent beam back to the centralized controller(s) 310a-n. These reports may include for example data relating to the frequency, signal strength (e.g., RSSI), persistence, or other metrics useful in assessing the relative utility of a given beam for that given CPE/FWA 324.

Specifically, the CPE/FWA radio (e.g., the outdoor portion 324a) obtains the signals and communicates either the raw signal data or processed measurements (depending on configuration) to the CPE/FWA radio path controller 333, which corresponds the data to individual beams of individual CBSD/xNBs (e.g., by maintaining a correlation data structure such as a table in its memory). In one implementation, each transmitting BS (e.g., CBSD/xNB 314) has an associated BS ID, and within each BS with N beams, there are N different beam IDs. As such, a BS ID and beam ID format may be used to uniquely identify each beam (and BS), based on the data received by the reporting CPE/FWA which includes the foregoing BS and beam ID data at reception. Moreover, in one implementation, the data for each beam includes relative attenuation and phase shift, angle of the receiving beam at the CPE/FWA radio antenna element, such as may be determined via e.g., comparison of parameters and/or timing associated with signals received by two different MIMO elements of the reporting receiver.

In the exemplary configuration, the CPE/FWA 324 is also configured to generate a comprehensive report; i.e., including data on all the Tx beams that the CPE/FWA can "see" for each Rx beam it can form. For instance, a given CPE/FWA may be able to form four (4) individual receive beams (e.g., which are precoded into the CPE/FWA receiver radio head logic). Within a given one of those 4 receive beams, the CPE/FWA may be able to resolve multiple different transmit beams transmitted from various ones of the CBSD/xNB MIMO elements (whether from the same CBSD/xNB, or two or more different ones). Accordingly, the exemplary embodiment of the CPE/FWA reporting logic is configured to report on all the transmit beams it detects within each of its precoded received beams (resolved on a per-receive beam basis), so as to afford the cognizant network controller 310 as much data as possible on generation of an optimal CBSD/xNB, beam, and scheduling plan for maximal service performance for that reporting CPE/FWA.

The opportunistically selected CBSD/xNB receives the (optionally encrypted or protected) reporting data bursts, and forwards them to the network radio controller 310 to decrypt/decode if necessary, and to use the data from the reporting CPE 324 to select/prepare the transmission of the next data downlink on the selected CBSD/xNB(s) 314, and the selected independent beams (e.g., which may correspond to one of a plurality of predesignated beams formed from the MIMO array of the CBSD/xNB) within those selected CBSD/xNB(s).

It will be appreciated that the aforementioned reporting/selection may be used to schedule one or more TDD slots or time periods, whether contiguous in time or not. For example, in one variant, selection/scheduling for each time slot is evaluated independently in advance of the occurrence of the slot. In another variant, several consecutive time slots are used as the basis of scheduling (e.g., the reporting and scheduling is conducted once every n consecutive slots, and then repeated for the next n slots, and so forth until the reporting indicates that the selection of the CBSD/xNB(s) or associated individual beams is no longer valid or appropriate.

Moreover, the selection may also include frequency selection, such as where the reporting data includes data on multiple possible channels or carriers to be utilized. Stated differently, depending on the granularity of the reporting data, available carriers for allocation (e.g., CBRS band availability), and suitability of the different reported carriers, multiple options for selection/delivery may exist in terms of (i) CBSD/xNB(s) to be utilized; (ii) individual beams formed by the CBSD/xNB MIMO elements; (iii) individual receive beams that can be formed by the target CPE/FWA, and (iv) carrier(s) to utilize.

The centralized or network controller process 310 is in data communication with the associated centralized scheduler process (the two processes may be co-located, logically separated, or physically separated as desired) to prepare the selection/scheduling data for the reporting CPE/FWA 324, and transmit the data via the selected CBSD/xNBs and their selected independent beams on the selected carrier(s) and time slots.

As can be appreciated, there may be a significant number of different CPE/FWA 324 within the coverage areas of the CBSD/xNBs associated with a given network controller/ schedule 310. Each CPE/FWA installation may have markedly different path dynamics and RF signal propagation associated with it, and as such the exemplary embodiment of the network architecture of FIG. 4 utilizes individualized reporting for each of the different CPE/FWA devices. Accordingly, each different CPE/FWA 324 may utilize a different combination of elements (i)-(iii) above, as well as different time slot scheduling. Notwithstanding, it is also recognized that aggregation of two or more individual CPE/FWA for purposes of signal data reporting and/or utilization of combined CBSD/xNB, beams and frequencies may be used, such as where the two or more CPE/FWA devices are commonly located (e.g., on a common rooftop of the same building, nearby in a same neighborhood, etc.) and/or share sufficiently similar signal propagation characteristics. In such cases, one of the two or more CPE/FWA can be designated a "master" for data reporting purposes if desired (such as after the aforementioned suitable propagation characteristics and signal stability have been verified), thereby obviating multiple sets of reporting data and associated transmission "burst" bandwidth and overhead/processing by the controller(s).

At each CPE/FWA 324, the radio path controller logic 333 utilizes a receive antenna steering algorithm to "steer" the receive antenna to the proper position to receive the signal from the contributing CBSD/xNBs (i.e., those selected by the network controller for the designated time slot(s)), and their selected independent beams. In one embodiment, the selection of the beam(s) is based on (i) first identifying each beam and measuring its SNR (and/or the beam signal quality), then (ii) sorting based on one or more of the SNR/quality, and (iii) then selecting the highest ranked or best alternatives in order. Note that in one variant, the maximum number of beams selected can be capped or limited, such as to ensure the best intersection or maximization of signal/user service quality vs. "cost" (whether actual cost or virtual/resource consumption cost to the network). For example, if a given target CPE/FWA has 10 identified CBSD/xNBs with 14 beams in total theoretically available, then the amount of transmitted power form those 10 CBSD/xNBs and the processing in the CPE/FWA 324 will far exceed the amount of throughput gain that would be achieved from say 4 contributing CBSD/xNBs with 6 total beams, and as such, the exemplary logic would determine the reduced incremental return in performance and select the appropriate level of participation/contribution by the candidate constituent CBSD/xNBs and beams (e.g., by selecting the top N CBSD/xNBs and n beams associated therewith).

At the receiving end, once the constituent CBSD/xNBs and beams are selected and the resource plan implemented, the target CPE/FWA radio receiver collects the transmitted signals from all the contributing independent beams and combines them coherently, based on phase and amplitude information from the CPE/FWA radio path controller entity 333. In one exemplary embodiment, the target CPE/FWA and contributing CBSD/xNBs coordinate to assist the CPE/ FWA in optimal reception of the transmitted signals via the selected beams. In one implementation of this coordination process, the CPE/FWA 324 first will detect the signals from the corresponding CBSD/xNBs and their selected beams to be the most "proper" (i.e., most likely to correspond to the selected beams/CBSD/xNBs). Then, the CPE/FWA will report the amplitude and phase of each detected signal back to the corresponding transmitter. The CNSD/xNB controller logic then utilizes this reported amplitude and phase data to identify the amount of attenuation and phase shift from its transmit operation, as compared to the values reported by CPE/FWA (i.e., what the CBSD/xNB is transmitting versus what the CPE/FWA is actually receiving). Such differences may be caused by any number of factors, including multipath propagation, interfering transmitters, and the like. When the next data transmission occurs (or prior thereto), the transmitting CBSD/xNB will send with it the estimated amplitude attenuation and phase shift data determined based on the aforementioned comparison, which aids the target CPE/FWA in the compensation of the phase and amplitude for that subsequent TDD reception cycle or cycles.

It will be appreciated that while the exemplary embodiments described herein utilize a significant amount of logic within the network radio controller entity 310 for the selection and configuration of the various CBSD/xNBs, independent transmission beams, and time slot/frequency scheduling, at least a portion of these functions can be provided by the CPE/FWA radio path controller entity 333. Specifically, in one such variant, the CPE/FWA gathers signal data as previously described herein; i.e., relating to phase and amplitude of signals of a prescribed frequency from its various MIMO antenna elements. To the degree that the transmitting CBSD/xNB for each of the constituent signals (and the pre-existing beam used by that CBSD/xNB for the transmission of the signal(s), such as via a pre-designated beam "codebook" maintained by the CBSD/xNB), the CPE/ FWA may be configured to catalog the signals it receives as being generated by a certain beam of a certain particular CBSD/xNB. As such, the CPE/FWA controller entity logic may evaluate these data to generate a selection or recommendation to be forwarded to the host network controller entity 310 (via the transmitting CBSD/xNB), thereby relieving the network controller of the decision/analyses. Scheduling of TDD slots and frequency assignments may still be required by the network controller entity 310 under this model, however, since any given CPE/FWA 324 does not have a "global" view of these parameters or their utilization by other entities such as other CBSD/xNB with which it may not be presently in communication.

It will also be appreciated that the foregoing architecture allows for a maximum quality RF data link between the constituent CBSD/xNB devices 314 and the CPE/FWA in both directions (i.e., DL and UL). Specifically, it is assumed for purposes of the analyses herein that both the forward and reverse (DL and UL) RF propagation paths between a given CBSD/xNB and CPE/FWA are wholly symmetric, and include identical path losses and link budgets As such, when selecting an optimal configuration of CBSD/xNBs, beams, and carriers, it can be assumed that the selection applies equally well for both DL and UL transmissions.

Figure 4A:
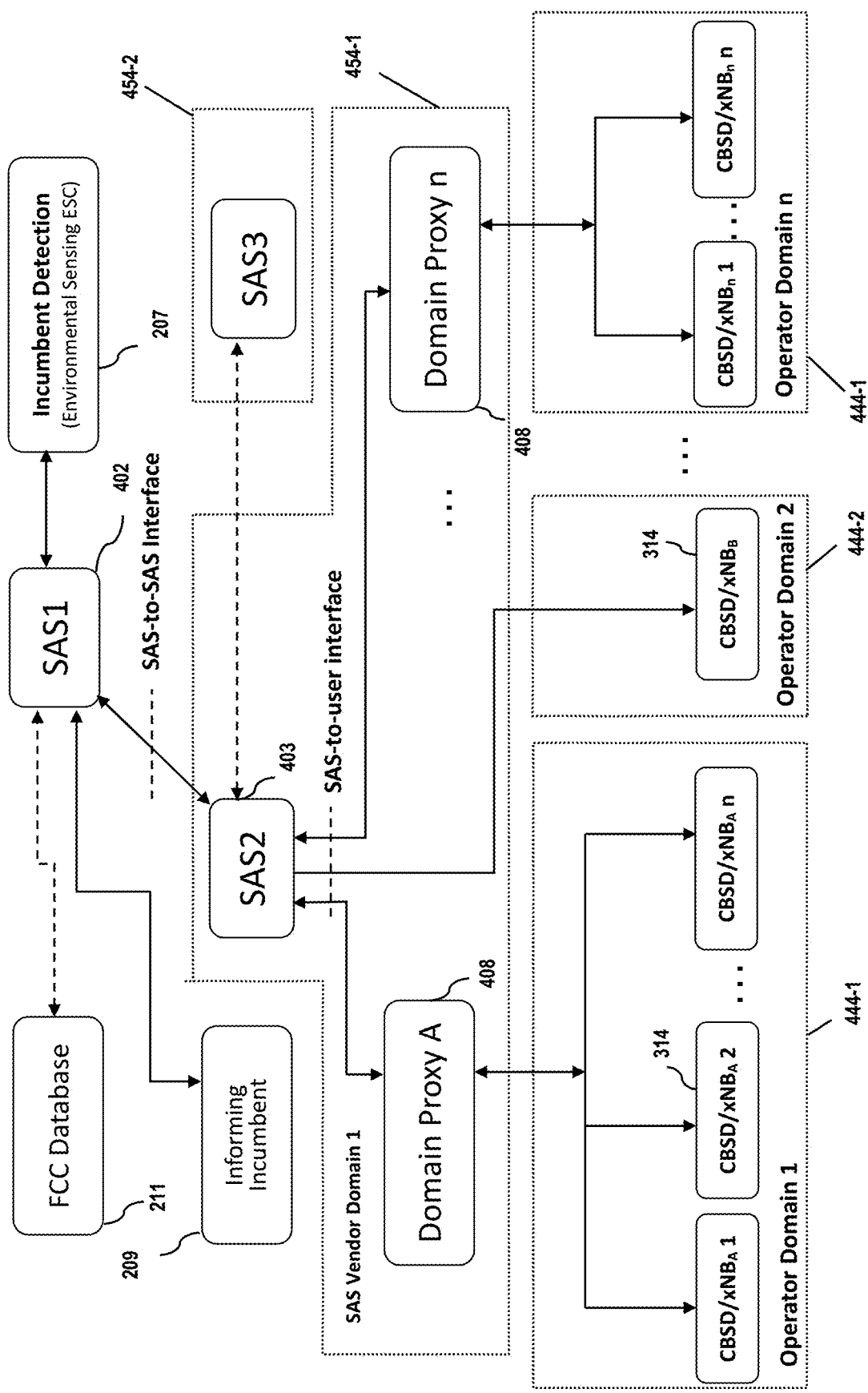
FIG. 4a is a functional block diagram of a first exemplary implementation of the quasi-licensed wireless network architecture of FIG. 4, including operator domains and SAS vendor domains.
Figure 4B:
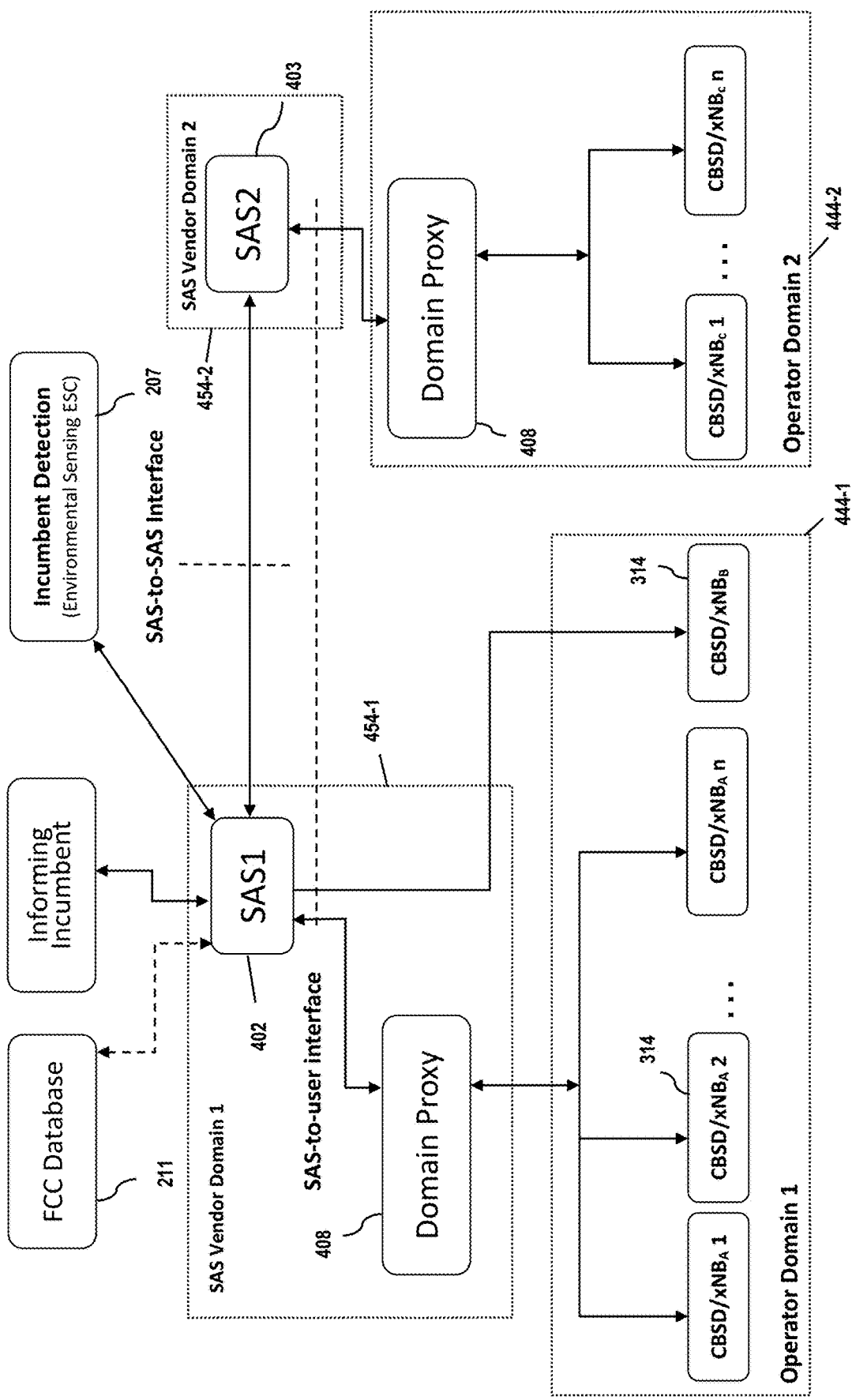
FIG. 4b is a functional block diagram of a second exemplary implementation of the quasi-licensed wireless network architecture of FIG. 4, including operator domains and SAS vendor domains.

FIGS. 4a and 4b illustrate exemplary alternate configurations of SAS1 402, SAS2 403, and DPs 408 useful with the various embodiments of the methodologies and apparatus described herein. It will be appreciated that these configurations are intended merely to illustrate operation of the aforementioned methods and apparatus of the present disclosure, and should in no way be considered limiting. Adaptation of the methods and apparatus described herein to yet other types of configurations (including non-CBRS applications) can be accomplished by those of ordinary skill when provided the present disclosure.

As shown in FIG. 4a, multiple operator domains 444 are serviced by respective CBSDs/xNBs 314. Two domains 444-1 of the three operator domains are served by respective DPs 408 within a first SAS vendor domain 454-1. The two DPs 408 are served by a common SAS (SAS2 403), which interfaces with the SAS1 402 outside the domain 454-1 as illustrated. The third operator domain 444-2 is directly served by the SAS3 403, with no DP (e.g., this domain 444-2 may for example include its own internal DP, or has otherwise obviated the functions thereof).

Referring now to FIG. 4b, multiple operator domains 444 are again serviced by respective CBSDs/xNBs 314. One of the two operator domains 444-1 are served by respective DPs 408 within respective SAS vendor domains 454-1 and 454-2. The two DPs 408 are served by different SAS; e.g., SAS1 402 for the first domain 454-1, which interfaces with incumbent detection apparatus 207 and the FCC database 211 (as well as informing incumbents) as illustrated. The second operator domain 444-2 and its DP 408 are served by SAS2 403 within vendor domain 454-2.

Returning again to FIG. 4, the MSO subscriber and CBRS database 404 includes several types of data useful in operation of the system 400. As part thereof, the MSO database 404 includes data relating to, among other things: (i) CBSD/xNB 314 and/or CPE/FWA 324 identification (e.g., MAC), (ii) CBSD/xNB and/or CPE/FWA location (which is presumed fixed), (iii) association with parent or child nodes or networks (if any) including which CPE/FWA 324 are associated with which CBSD/xNB and "host" network controller entity 310, and (iv) CBRS/xNB and CPE/FWA configuration and capabilities data (including for example the number of spatial diversity antenna elements available to each device). The CBRS database 404 may also include MSO-maintained data on spectrum usage and historical patterns, channel withdrawals, and other data which enable the MSO to proactively "plan" channel usage and re-assignment (including on per-TDD slot or group-of-slots basis) within the premises venue(s) of interest where the CBSD/xNB(s) 314 and associated CPE/FWA 324 operate in certain embodiments herein.

In certain embodiments, each CPE/FWA 324 is located within and/or services one or more areas within one or more premises or venues (e.g., a building, room, or plaza for commercial, corporate, academic purposes, and/or any other space suitable for wireless access). Each CBSD/xNB 314 is configured to provide wireless network coverage within its coverage or connectivity range, subject to the EIRP limitations on Category B devices. For example, a venue may have a wireless modem installed within the entrance thereof for prospective customers to connect to, including those in the parking lot via inter alia, their LTE-enabled vehicles or personal devices of operators thereof. Notably, different classes of CPE/FWA 324 and CBSD/xNB 314 may be utilized. For instance, as previously noted, Category A devices can transmit up 30 dbm (1 watt), while Category B devices can transmit up to approximately 50 dbm, so the average area can vary widely (including depending on whether the multi-CBSD signal aggregation techniques described herein are used or not).

In one exemplary embodiment, one or more CBSDs/xNBs 314 may be directly controlled by the CBRS network controller 310 (i.e., via infrastructure of the MSO network), in conjunction with a local or "client" CBRS controller entity 333 disposed at the venue (e.g., as part of the CPE/FWA 324). The network controller 310 and its associated scheduler logic is implemented in this instance as a substantially unified logical and physical apparatus maintained within the MSO domain, such as at an MSO headend or hubsite, and in communication with the MNO core 411 via the MSO core function 412, although the scheduler and controller may also be logically and/or physically partitioned, including being at different locations. The network controller entity 310 also optionally includes algorithms to optimize operation of the "local" CBRS network maintained by the MSO, such as within a target venue or area, when supporting operation of the SAS/DP inter-cell handover procedures (e.g., where the MSO controller is tasked with generating a migration plan). These optimizations may include for example: (a) utilization of the environmental interference data from the CPE/FWA reporting to characterize the CBRS band(s) of the venue/area; (b) use the characterization of (a) to structure migration plans for frequency reassignment within the CBRS band(s) to the DP/SAS (e.g., which will mitigate interference or contention/collisions within the venue/are in those bands); (c) use the interference data and other relevant data (e.g., attendance, time, interference/signal as a function of CBSD/xNB location, etc.) to build historical profiles of spectrum use a function of various variables, including profiles particular to the venue/area itself, as described in co-owned U.S. patent application Ser. No. 15/612,630 filed Jun. 2, 2017 entitled "APPARATUS AND METHODS FOR PROVIDING WIRELESS SERVICE IN A VENUE," and issued as U.S. Pat. No. 10,645,547 on May 5, 2020, incorporated herein by reference in its entirety; (d) utilize data regarding spectrum availability withdrawals (e.g., where DoD assets require use of a previously allocated band) and other events to generate predictive or speculative models on CBRS band utilization as a function of time, including in support of migration plans.

Figure 2:
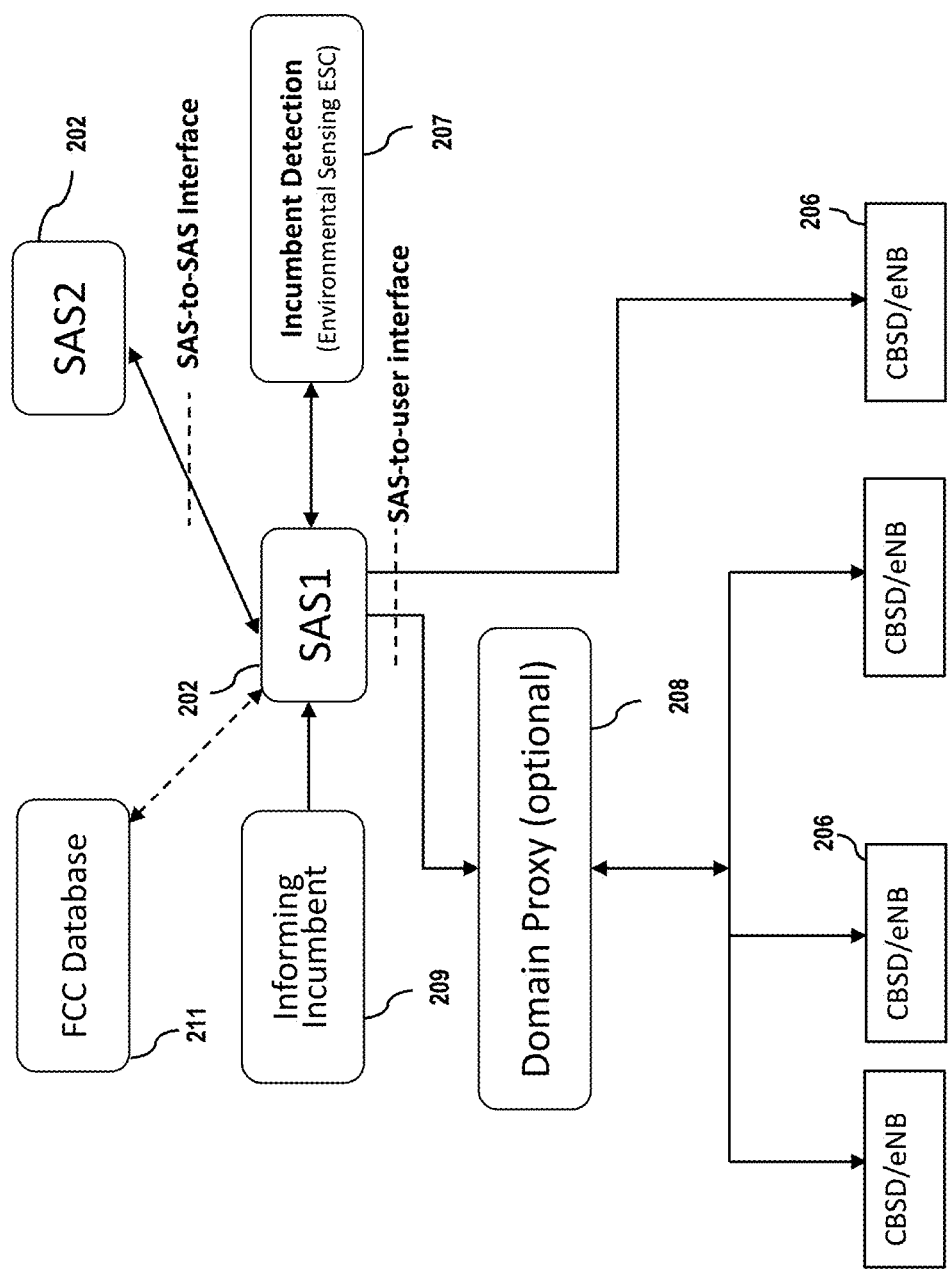
FIG. 2 is a block diagram illustrating a general architecture for the CBRS system of the prior art.
Figure 2A:
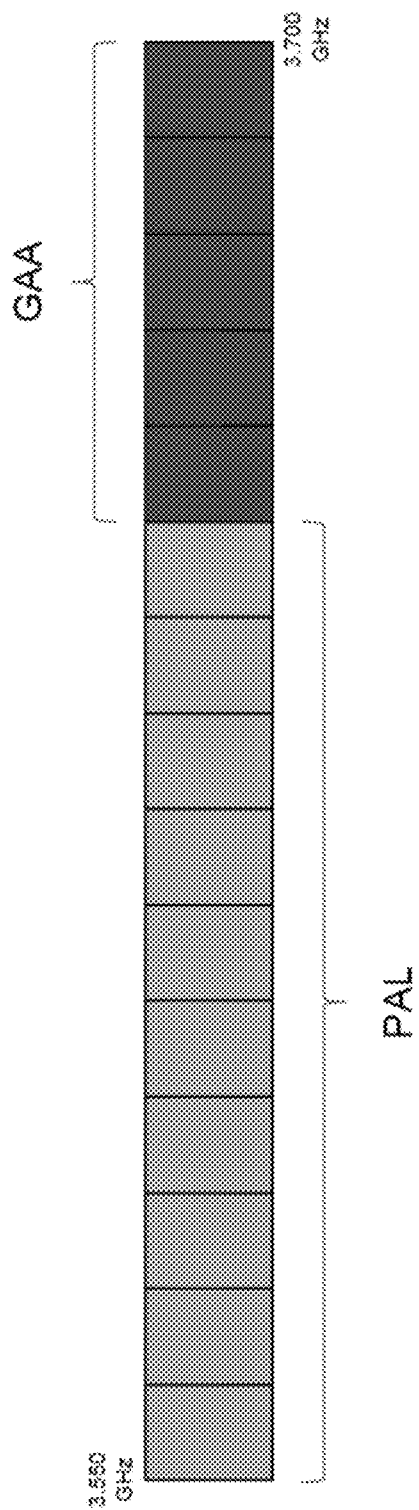
FIG. 2a is a graphical representation of allocations for PAL versus GAA users within the frequency band of FIG. 2.
Figure 2B:
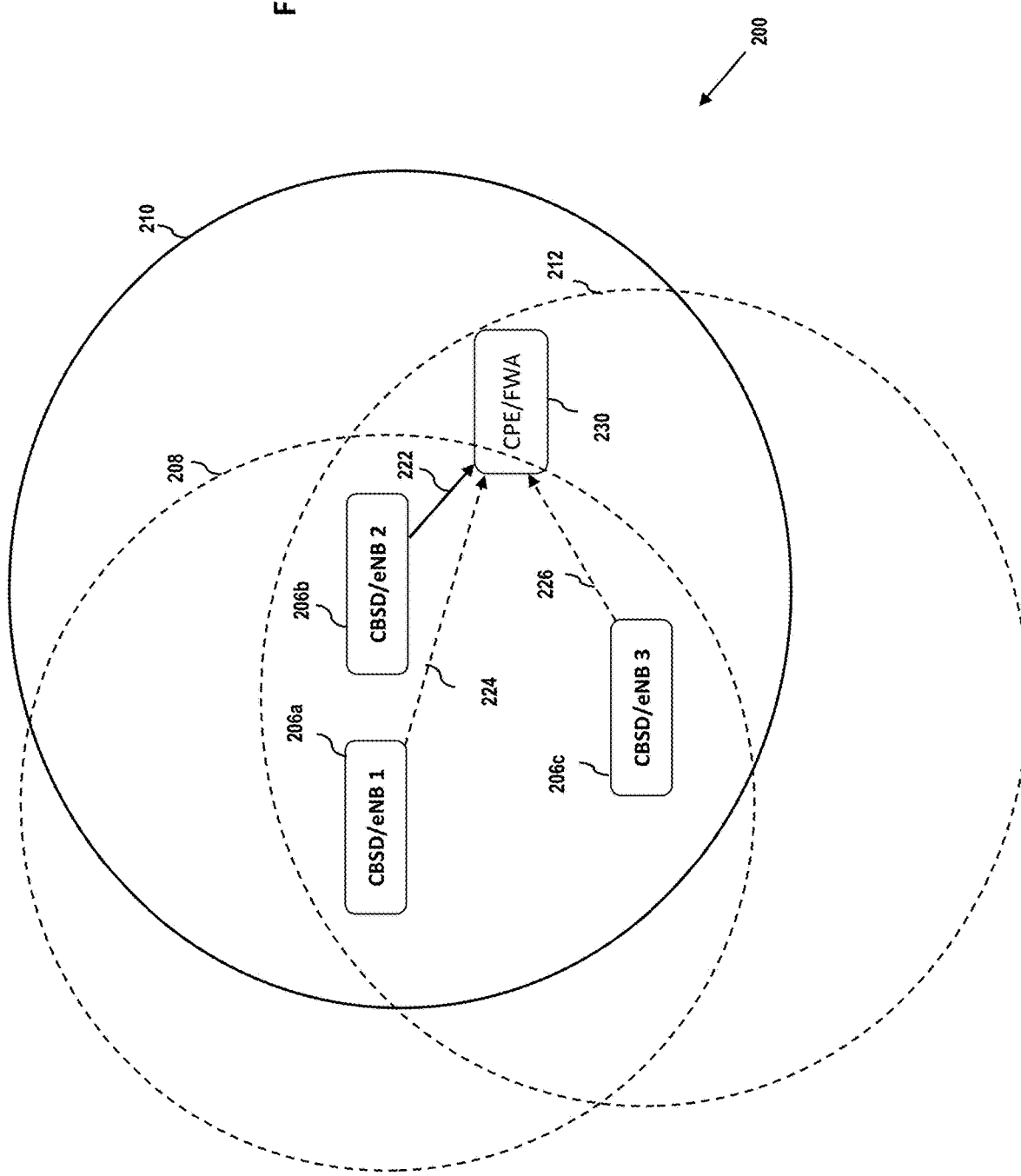
FIG. 2b is a graphical representation of a served device (CPE/FWA) within the wireless coverage areas of three (3) different transmitters (here, CBSD/xNB devices), illustrating a prior art wireless signal delivery from a single transmitter.
Figure 5:
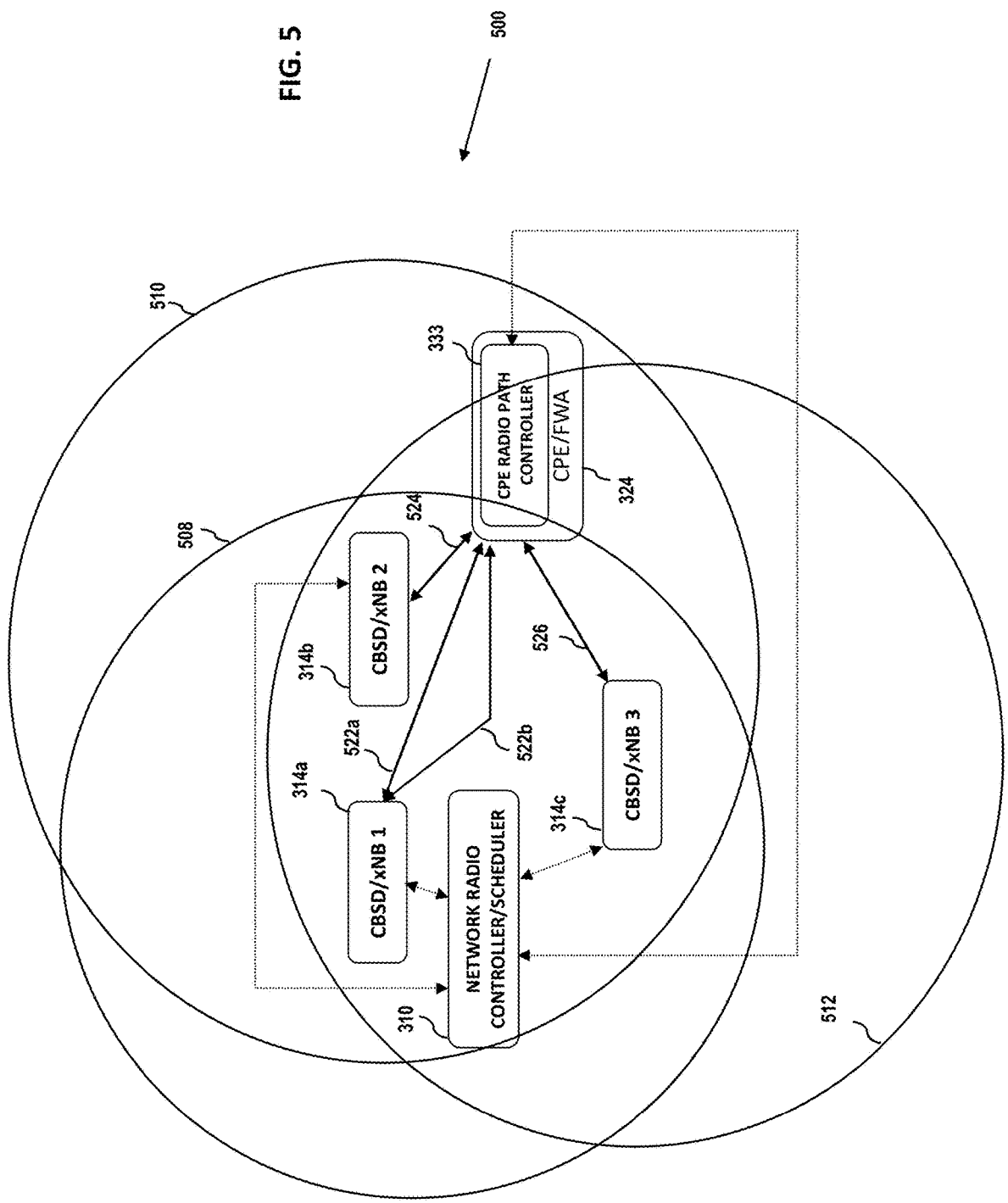
FIG. 5 is a graphical representation of a served device (CPE/FWA) within the wireless coverage areas of three (3) different transmitters (here, CBSD/xNB devices) and selectively receiving wireless signals therefrom based on cooperation between a network controller/scheduler and CPE controller, according to one embodiment of the present disclosure.

FIG. 5 is a graphical representation of a served device (CPE/FWA 324) within the wireless coverage areas of three (3) different transmitters (here, CBSD/xNB devices) and selectively receiving wireless signals therefrom based on cooperation between a network controller/scheduler and CPE controller, according to one embodiment of the present disclosure. As shown, during operation of the architecture 500, the network radio controller/scheduler 310 is in logical communication with the local or premises CPE/FWA radio path controller 333, via e.g., one or more "burst" communications via RF channels existing between one or more CBSD/xNB devices 314 that are controlled by the network controller 310. Notably, unlike the prior art approach shown and discussed with respect to FIG. 2b previously herein, the architecture 500 of FIG. 5 enables the establishment of multiple (two or more) separate RF channels between (i) a given CBSD/xNB 314 and the served CPE/FWA 324 via, e.g., two or more separate formed beams between the antenna elements of the CBSD/xNB and those of the CPE/FWA (see e.g., beams 522a and 522b associated with CBSD/xNB 1 314a, which are direct and multipath beams respectively), and/or (ii) two or more different CBSD/xNBs that each have one or more beams 522a-b, 524, 526 that are established between itself and the target or served CPE/FWA 324. These channels, when "added" by the receiver processing based on phase/timing correction (if needed) and TDD slot utilization, effectively enhance data bandwidth delivered to/from the CPE/FWA, and further expand the potential geographic coverage of the illustrated system 500 (i.e., any overlap of two or more of the coverage areas 508, 510, 512 in the illustrated system is now eligible for enhancement of data rate by virtue of combination of beams from different constituent maximum-EIRP CBSD/xNBs, whereas under the prior art, a single CBSD/xNB and its associated coverage area would be the putative limit of coverage/capability).

Generally speaking, for a given CPE/FWA 324 to receive and utilize signals from different CBSD/xNBs 314, it will need to be on the same frequency and same time slot (presuming a single radio transceiver in the CPE/FWA). In various implementations, different schemes may be used by the CPE/FWA 324 to receive and combine the portions of the data stream(s) being transmitted. As previously discussed, in one variant, the network controller 310 and CPE/FWA radio path controller 333 coordinate to prepare the CPE/FWA to listen to the different TDD time slots with different scrambling codes, since it is predetermined (from prior communication between the controllers) that the CPE/FWA can "see" those CBSD/xNB's (somewhat akin to the neighbor measurements in a handover process utilized by a 3GPP UE, which measures on each BS with its own scrambling code and return values). Once it is established that the fixed CPE/FWA 324 can detect for example CBSD/xNB 1, 3, 4, and 5, then in one variant, the radio path controller 333 of the given CPE/FWA will instruct the network controller 310 of the detected CBSD/xNBs (using the mechanisms described elsewhere herein) to transmit the data destined for this CPE/FWA on a common time slot from each of those CNSD/xNBs (i.e., force each CBSD/xNV 314 to "follow" that CPE/FWA).

Alternatively, the controller 310 may instruct the relevant CBSD/xNBs to transmit at different time slots (e.g., according to a prescribed schedule, which may accommodate other CPE/FWA time slots already scheduled, etc.), and instruct the CPE/FWA via DS communications via the CBSD/xNB (s) to tune for each of the different time slots to an assigned CBSD/xNB for that time slot (e.g., the CPE will "follow" the CBSD/xNBs). Note that this approach markedly distinguishes over normal operation of the 3GPP LTE technology, but can implemented if both transmitter(s) and receiver are fixed, and know in advance which TDD slot(s) to tune to for listening and communicating.

Alternatively, if the CPE/FWA has two or more (N) independent radio transceivers, it can listen to N different frequencies at different time slots, and hence the present disclosure contemplates both configurations and permutations thereof for the CPE/FWA 324; i.e., (i) a single transceiver monitoring a given frequency and TDD slot to receive all contributing or constituent CBSD/xNB signals; (ii) two or more transceivers each monitoring different frequencies and/or slots for generation of independent data streams, such as where a given CPE/FWA supports two independent users; and (iii) two or more transceivers each monitoring different frequencies and/or slots for generation of a common data stream (i.e., the outputs of each transceiver are in effect additive). However, such additional transceivers add additional cost to the CPE/FWA, and hence such implementations must be balanced against commercial considerations, especially if a single transceiver provides suitable levels of performance for CPE/FWA users.

Figure 5A:
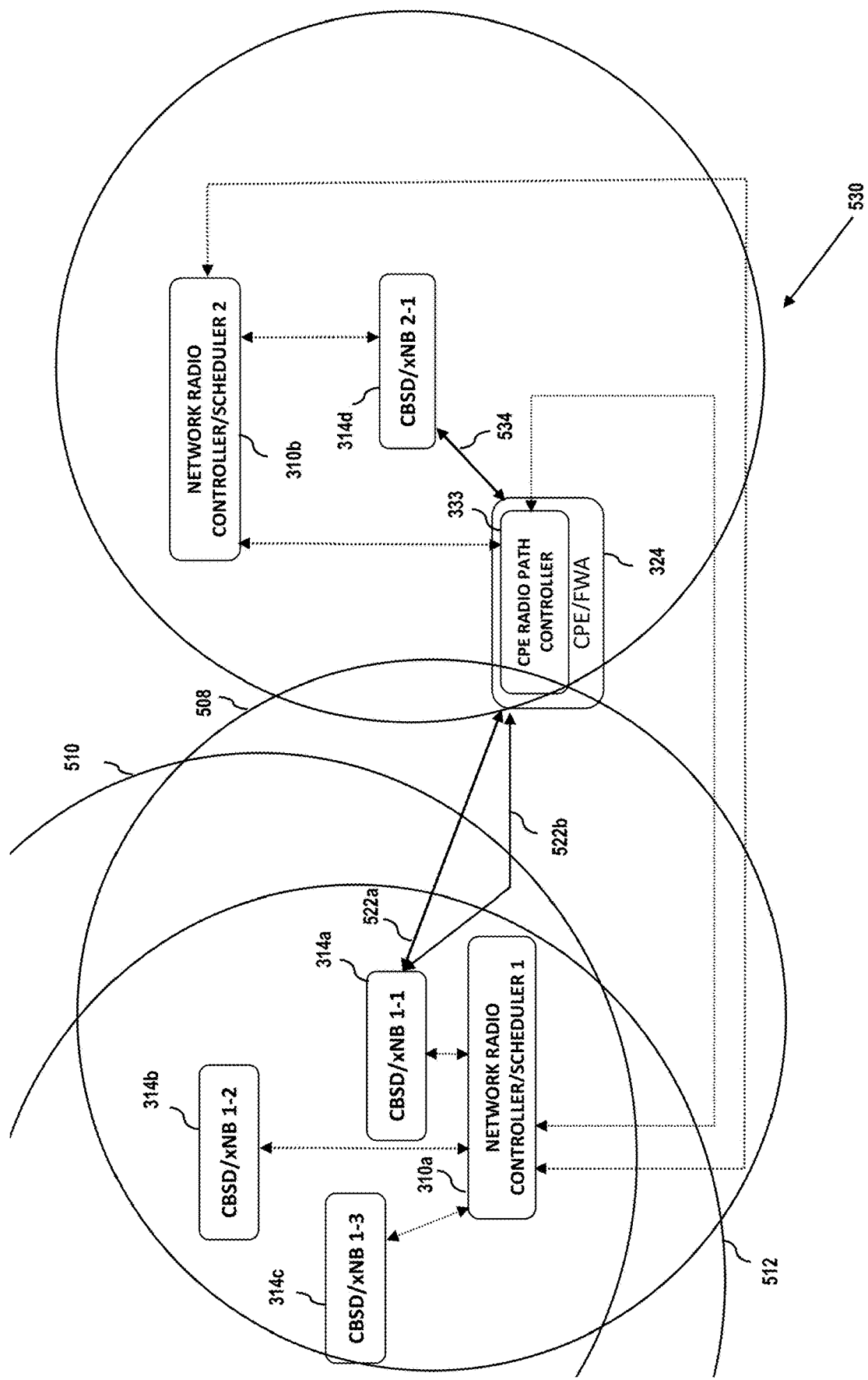
FIG. 5a is a graphical representation of another embodiment of a controller architecture according to the present disclosure, wherein the CPE/FWA is within the wireless coverage areas of different transmitters associated with two different network controllers/schedulers, the two controllers/schedulers in direct data communication with one another for purposes of coordination of wireless services delivery.

In addition, the present disclosure contemplates two or more network-side controllers 310 which may coordinate, such as where the "best" or optimal beams received by the target CPE/FWA originate from CBSD/xNBs controlled by different network controllers. Specifically, FIG. 5a is a graphical representation of another embodiment of a controller architecture 530 according to the present disclosure, wherein the CPE/FWA is within the wireless coverage areas of different transmitters (CBSD/xNB 1-1 314a and CBSD/xNB 2-1 314d) associated with two different network controllers/schedulers 310a, 310b, respectively, the two controllers/schedulers in direct data communication with one another for purposes of coordination of wireless services delivery. In one variant, data communications similar to that described elsewhere herein for communication of scheduling and beam data between the network controller 310 and the CPE radio path controller 333 are utilized between the two (or more) network controllers 310a, 310b of FIG. 5a for purposes of coordination (such as via an MSO backhaul or LAN data connection), although it will be appreciated that other mechanisms for inter-controller communication and coordination may be used consistent with the present disclosure.

Figure 5B:
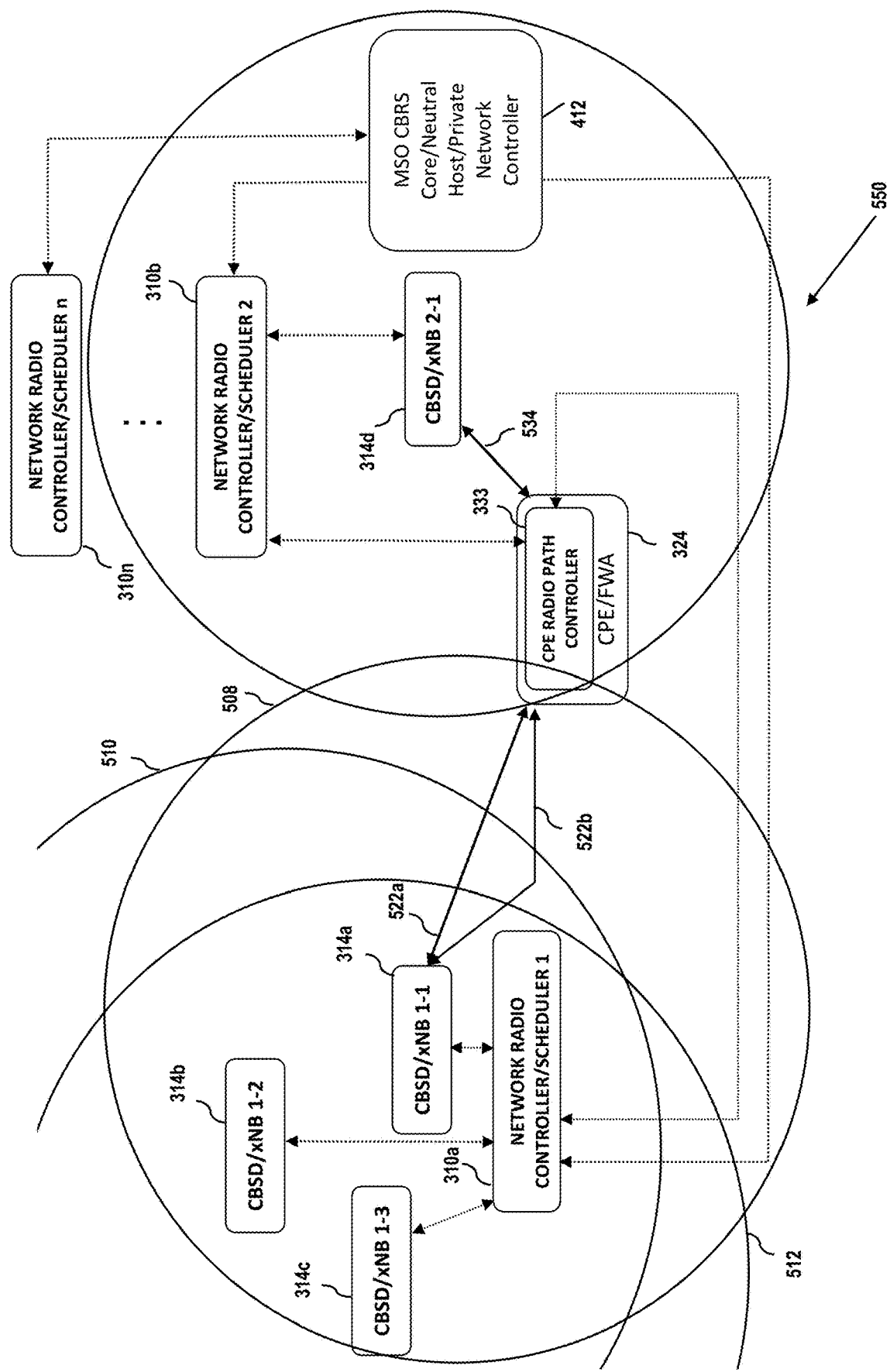
FIG. 5b is a graphical representation of another embodiment of a controller architecture according to the present disclosure, wherein the CPE/FWA is within the wireless coverage areas of different transmitters associated with two different network controllers/schedulers, the two controllers/schedulers in indirect data communication with one another via a network CBRS Core Controller for purposes of coordination of wireless services delivery.

FIG. 5b is a graphical representation of yet another embodiment of a controller architecture 550 according to the present disclosure, wherein the served or target CPE/FWA is within the wireless coverage areas of different transmitters associated with two different network controllers/schedulers 310a, 310b, yet unlike the embodiment of FIG. 5a, the two controllers/schedulers are in indirect data communication with one another via a network CBRS Core Controller 412 for purposes of coordination of wireless services delivery. In this case, the CBRS Core Controller 412 includes logic to coordinate the delivery of services to the CPE/FWA 324, with the individual network controllers 310a, 310b (and yet others 310n) acting merely as "minion" devices. As such, each of the minion network controllers 310a, 310b, 310n can be more simplified than those of FIG. 5a, in that they only need receive and implement instructions from the Core Controller 412 versus generating a CBSD/xNB and beam allocation plan for the given temporal period (e.g., TDD slot(s)) for each target CPE/FWA 324. It will also be appreciated that in the case where CBSD/xNBs associated with multiple different controllers are used to contribute signal to a given target CPE/FWA 324, the controllers may communicate in "daisy chained" fashion (not shown), including the instance where one of the two or more network controllers 310a-n is the designated "master" controller for purposes of, inter alia, providing command and scheduling data to the target CPE/FWA via one or more of its beams (the provided data including data associated with beams of CBSD/xNBs associated with another network controller).

Methods—

Figure 6:
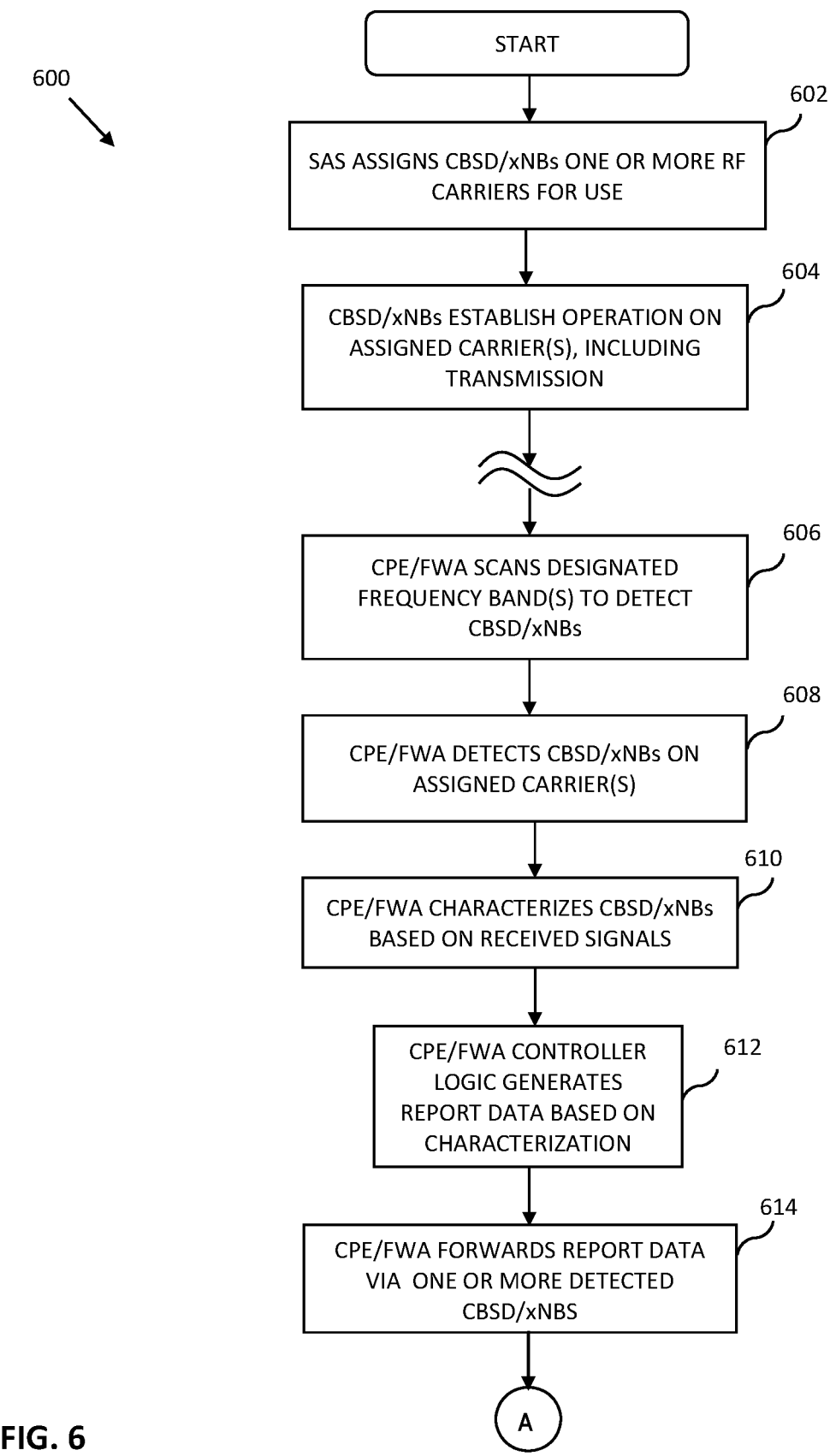
FIG. 6 is logical flow diagram of an exemplary method for providing high-bandwidth wireless data service to a served CPE/FWA from two or more CBSD/xNB devices, according to the present disclosure.
Figure 6:
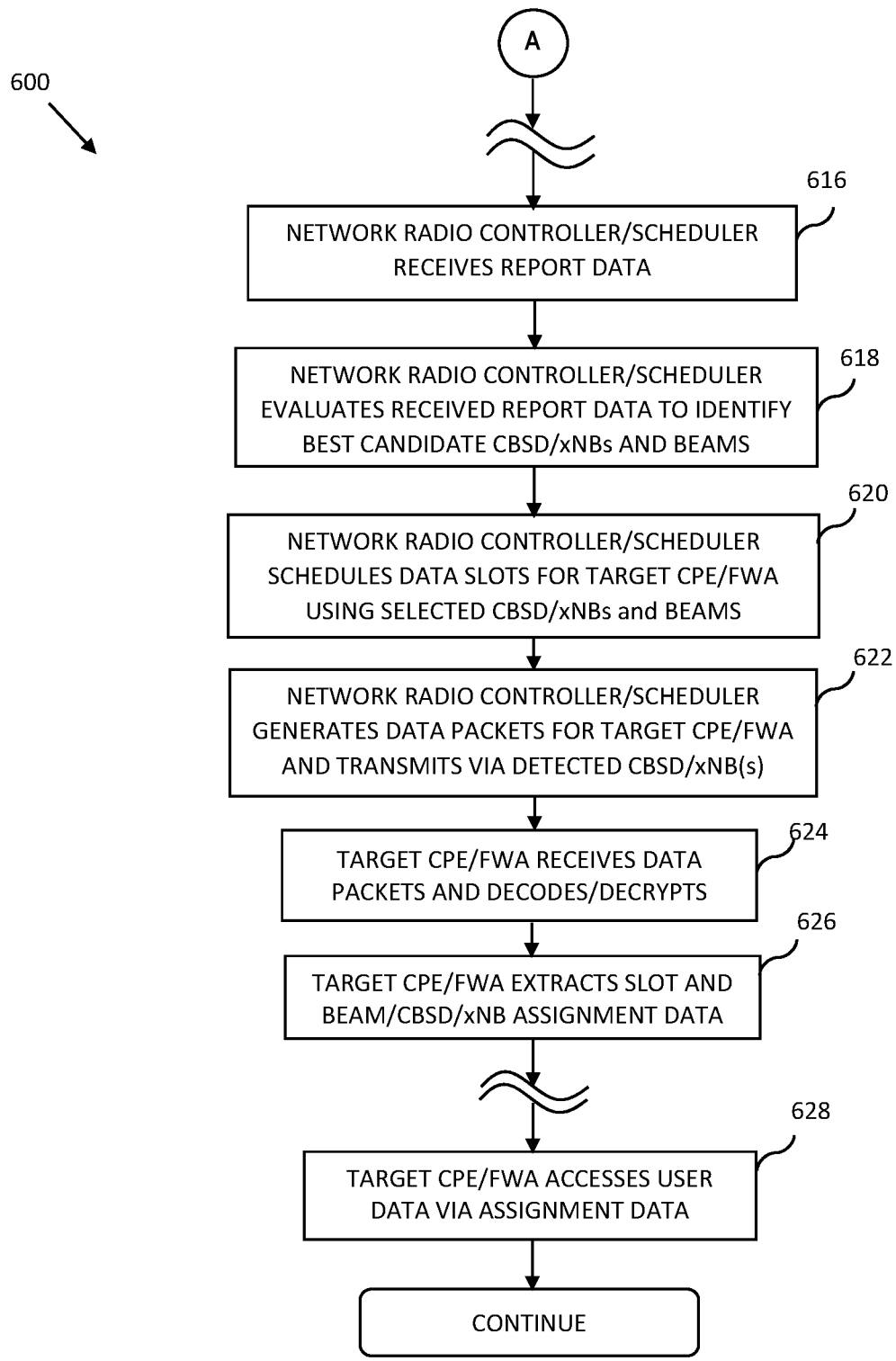
Figure 6A:
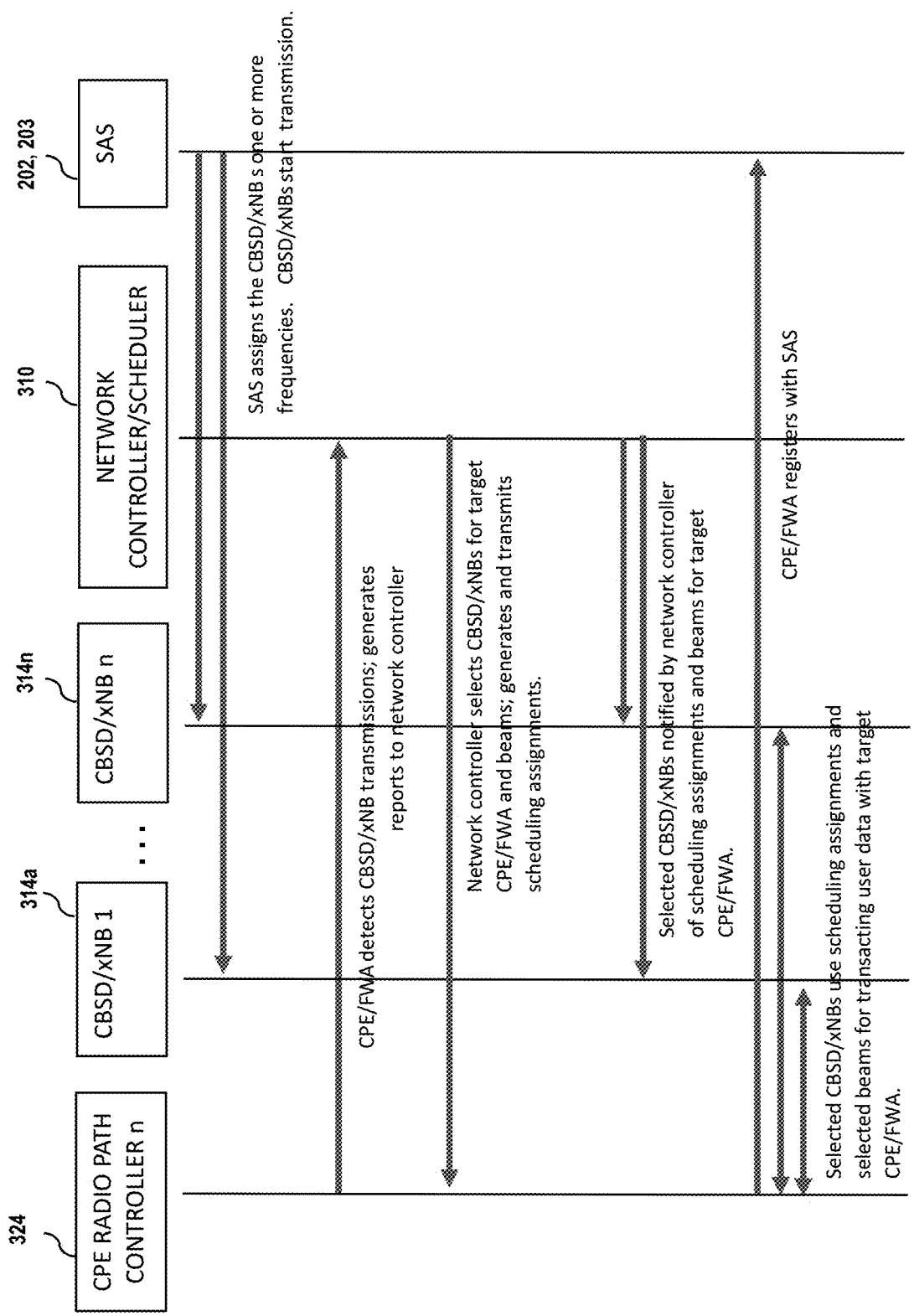
FIG. 6a is a ladder diagram illustrating the communication flow for quasi-licensed band multi-CBSD/xNB, multi-beam wireless service in accordance with the method of FIG. 6.

Various methods and embodiments thereof for providing quasi-licensed (e.g., CBRS GAA) utilization for enhanced data rate and/or coverage area according to the present disclosure are now described with respect to FIGS. 6-6a.

Referring now to FIG. 6, one embodiment of the general methodology 600 of providing enhanced wireless services according to the present disclosure is shown and described, in the exemplary context of a CBRS-based system with SAS, CBSD/xNBs 314, network and local controllers 310, 333, and CPE/FWA 324 as previously described.

As discussed above, the CBSD/xNB(s) may interface with the host SAS directly, or via one or more interposed entities such as computerized domain proxy (DP) entities 408. For the purposes of illustration, it will be assumed that each of the registering CBSD/xNBs is/are associated with a common network operator (NO) domain, although this is not a requirement for practicing the method 600.

At step 602 of the method 600, the SAS assigns one or more RF carrier (s) to each of a number of CBSD/xNB (whether individually or as a group, such as via an assignment to the host network controller 310 cognizant over each of the CBSD/xNBs), based on for instance lack of DoD usage of those carriers in the prescribed area(s). This assignment may occur for example via CBRS-compliant protocol messages transmitted from the SAS or DP to the target CBSD/xNBs (or their network controller 310) indicating their frequency assignment(s) via wired or wireline communication (e.g., backhaul) between the target CBSD/xNBs or controller and the SAS/DP.

Per step 604, the CBSD/xNBs establish operation on the assigned carrier(s), including transmission or broadcast of signals detectable by CPE/FWA 324 operating in the area and within communication range. It is assumed for sake of this discussion that the CPE/FWA is within the communications range of at least two of the participating CBSD/xNBs 314, the latter operating at maximum Category B EIRP.

Per step 606, the CPE/FWA 324 invokes its discovery procedures (such as upon UE service request, according to a prescribed schedule, after CPE/FWA device re-initialization or installation, etc.) and begins its scan of one or more prescribed frequency bands to attempt to detect and identify eligible serving CBSD/xNBs 314. Per step 608, the CPE/FWA eventually detects the CBSD/xNBs operating on the SAS-assigned carriers from steps 602-604.

It will be appreciated that while the method 600 of FIG. 6 is described in terms of the CPE/FWA conducting what amounts to a "blind discovery" of existing CBSD/xNBs within its communications range per steps 606 and 608, these steps may be at least partially obviated by a priori knowledge of the existing/frequency of a given CBSD/xNB, such as via recent prior communication. As such, the CPE/FWA may also have already developed a list of known devices within its range and their identities, or be provided such information from a network entity such as the network controller 310.

Per step 610, the CPE/FWA utilizes the detected RF signals as the basis of evaluation or characterization of the detected CBSD/xNBs 314, including evaluation for relative phase, amplitude, frequency, and/or other parameters of interest in identifying which signals may be eligible for subsequent utilization by the CPE/FWA in establishing DL and UL data communications.

At completion of the evaluation/characterization procedure, the CPE/FWA (specifically the controller logic 333) generates reporting data based thereon (step 612), which is stored locally and forwarded to the network controller entity 310 via the detected CBSD/xNBs per step 614, such as via the previously described burst-mode communications. In one implementation, the CPE/FWA will send the measurement report data to the CBSD/xNB via an established 3GPP control channel between the CPE/FWA and an initial CBSD/xNB with which the CPE/FWA has connected. For instance, the CPE/FWA may transmit the reporting data via a PUSCH channel with the initial CBSD/xNB, or a dedicated control channel, when in RRC Connected state. The cognizant network controller 310 is then provided the report data via the receiving CBSD/xNB for further analysis. This foregoing process can be accomplished at the beginning of session establishment for example, such as prior to multiple CBSD/xNBs transmitting their "contributive" signals to the target CPE/FWA. Note that since the CPE/FWA is fixed (as are the CBSD/xNBs), then the variability of the received signals will advantageously be slow and small, in contrast to mobility applications where significant changes may occur over short periods of time. Moreover, by having multiple contributing beams, any more rapid variations (due to whatever cause) will only presumably affect one of the several constituents.

Per step 616, the network radio controller/scheduler 310 receives the reports transmitted by the target CPE/FWA from the intervening CBSD/xNBs and decodes them as necessary (including any requisite decryption).

Per step 618, the network controller/scheduler 310 accesses the data within the reports to evaluate and identify the best candidate CBSD/xNBs and individual beams thereof for providing service to the target CPE/FWA for the prescribed future time period (e.g., n incipient TDD slots). In that the carriers may have already been assigned to given CBSD/xNBs (or there is only one available carrier), frequency selection may or may not be required as well. This identification may be based on e.g., (i) relative amplitude or signal strength of the different candidate CBSD/xNBs; (ii) relative amplitude or signal strength of the different individual beams of the candidate CBSD/xNBs; (iii) phase or timing differences between different beams (e.g., whether one candidate is a direct propagation path, or is a multipath propagation), (iv) signal stability (e.g., whether the measured properties of the candidate have persisted with acceptable stability/variation over m prior reports from that CPE/FWA), and other factors which may be available to the network controller/scheduler 310 in deciding on resource allocations.

As previously noted, in the exemplary embodiment, the aforementioned analyses and identification of "best" candidates by the network controller/scheduler 310 proceeds in parallel on an ongoing basis for multiple different served or target CPE/FWA within the cognizance of that host controller/scheduler. As such, the controller/scheduler is advantageously in position to also schedule resource block mapping for the multiple served CPE/FWA; i.e., TDD time slot scheduling. Somewhat akin to extant time-frequency resource mapping used in association with PRBs in OFDM systems, the exemplary network controller/scheduler logic of the present disclosure maps different CPE/FWA services to different time-CBSD/xNB-beam resources so as achieve one or more desired performance or other goals (e.g., achieve desired data rates to the served CPE/FWA, maintain QoS requirements, etc.).

Per step 620 of the method 600, the network controller/scheduler schedules data transmissions for the target CPE/FWA 324 into one or more data slots or frames of the TDD time-divided DL medium. The controller/scheduler may also schedule UL slots or frames for use by the CPE/FWA in communicating upstream data to the selected CBSD/xNBs. As noted above, since multiple CPE/FWA are being serviced at the same time, the scheduler routines are configured to accommodate different CPE/FWA (whether UL or DL) or different time (or time-frequency) resources, and may utilize different CBSD/xNBs and/or beams to service different ones of the CPE/FWA.

Per step 622, the network controller/scheduler 310 generates one or more data packets for transmission to the target CPE/FWA via the existing wireless path(s) between the detected CBSD/xNBs and the CPE/FWA (i.e., the same paths used for transmission of the upstream bursts of reporting data in step 614). These data packets include CBSD/xNB, beam, frequency, and TDD slot scheduling data for the target CPE/FWA to utilize at the prescribed slot(s) to either receive DL data (e.g., user data) from the participating CBSD/xNB(s), or transmit UL data thereto. The data packets may also be encrypted or otherwise protected against surreptitious use if desired. It will further be appreciated that one or more of these slots can be utilized for management or other "overhead" (i.e., non-user data), such as requests to the CPE/FWA for additional reporting, responses with the requested additional reporting data, future TDD slot and carrier scheduling data, and yet other types of data necessary to manage operation of the RF links between the CBSD/xNBs and the target CPE/FWA.

Per step 624, the target CPE/FWA receives the transmitted data packets and decodes/decrypts them as necessary via the radio path controller 333.

Per step 626, the decoded/decrypted data packets are evaluated to extract the requisite slot (scheduling), carrier, and beam assignment data for that CPE/FWA. As previously discussed, this data may relate to one or multiple TDD slots on the bearer medium. For instance, the scheduling data may indicate that the target CPE/FWA 324 utilize slots n through n+x (with n through n+x being repetitively occurring with a timing periodicity linked to the TDD frame structure) until directed otherwise; as such, the CPE/FWA may be granted a "static" slot assignment. Conversely, the slot assignment reflected within the transmitted data may only have a prescribed validity, which may be as few as one (future) slot.

In the exemplary embodiment, the decode and processing of the slot assignment data by the radio path controller logic 333 of the CPE/FWA must occur before the assigned slot is accessed to extract the user or other data transmitted in the assigned slot(s); note, however, that a "rolling start" approach may be used, such as where the decode and processing occurs in a JIT or just-in-time fashion so that a first assigned slot can be accessed before the controller logic 333 possesses the subsequent additional slot assignments needed to access all of the transmitted data.

Referring again to FIG. 6, per step 628, the CPE/FWA 324 uses the extracted assignment data of step 626 to access the user data in the assigned slots. This access may include for instance accessing different slots to extract user data transmitted by different CBSD/xNBs (and/or beams thereof), such that the CPE/FWA in effect assembles the whole of the user data from a plurality of slots transmitted via different RF propagation paths. As previously discussed, this allows for greater area coverage by the CBSD/xNB network, and/or greater data rates, since the effective received power experienced by the target CPE/FWA (that carries useful signal/data) is significantly higher than that achievable by a single transmitter operating at maximum CBSD EIRP.

FIG. 6a is a ladder diagram illustrating the communication flow for quasi-licensed band multi-CBSD/xNB, multi-beam wireless service in accordance with the method of FIG. 6.

CBRS Network Controller and Scheduler Apparatus—

Figure 7:
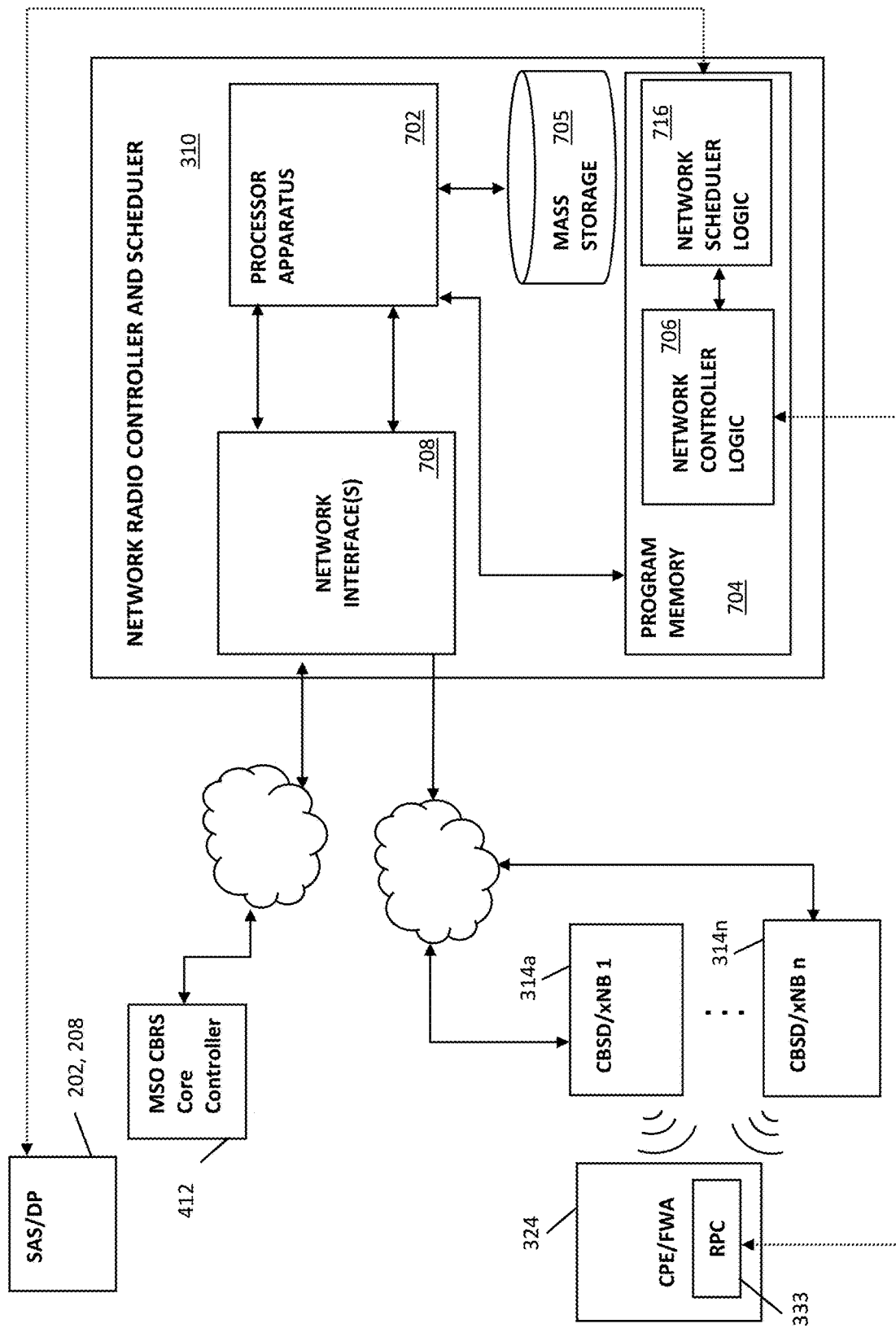
FIG. 7 is a functional block diagram illustrating an exemplary embodiment of a CBRS network controller and scheduler apparatus according to the present disclosure.

FIG. 7 is a functional block diagram illustrating an exemplary embodiment of a CBRS network controller and scheduler apparatus according to the present disclosure.

As shown, the controller and scheduler 310 includes, inter alia, a processor apparatus or subsystem 702, a program memory module 704, mass storage 705, controller and scheduler logic modules 706, 716, and one or more network (e.g., SAS/DP, CBSD/xNB and LAN) interfaces 708 such GbE, WiMAN, fiber optic, 5G NR, or other medium.

At a high level, the exemplary controller/scheduler 310 of FIG. 7 is configured to logically interface with the cognizant SAS/DP 202, 208 (see FIG. 4) and also the MSOCBRS core controller 412 (if present) and the various CBSD/xNBs 314 within the control of the controller/scheduler 310. The controller/scheduler 310 also logically interfaces with each of the CPE/FWA local radio path controllers (RPCs) 333 as previously discussed for, inter alia, reporting of detection data and asset/scheduling assignments.

In the exemplary embodiment, the processor 702 may include one or more of a digital signal processor, microprocessor, field-programmable gate array, or plurality of processing components mounted on one or more substrates. The processor 702 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 702.

The processing apparatus 702 is configured to execute at least one computer program stored in memory 804 (e.g., a non-transitory computer readable storage medium); in the illustrated embodiment, such programs include logic to implement the CBSD/xNB and beam selection, and slot/carrier assignment logic described previously herein (see e.g., FIGS. 6 and 6a herein). Other embodiments may implement such functionality within dedicated hardware, logic, and/or specialized co-processors (not shown).

In some embodiments, the controller/scheduler logic programs 706, 716 utilize memory 704 or other storage 705 configured to temporarily hold a number of data reports or files before transmission via the backend interface(s) 710 to the MSO CBRS Core controller 412 (if present), as well as schedule/assignment data packets for transmission to the target CPE/FWA RPCs 333 (and the participating selected CBSD/xNBs 314). In other embodiments, application program interfaces (APIs) may also reside in the internal cache or other memory 704. Such APIs may include common network protocols or programming languages configured to enable communication between the CBSD/xNBs 314 and controller/scheduler 310, and the controller/scheduler 310 and other network entities. Data stored may also relate to prescribed 3GPP or CBRS reporting from the CPE/FWA radio heads and associated controller logic 333 (e.g., measurement report data, RSSI, phase/timing, beams, etc. for use in evaluating and selecting the best or optimized CBSD/xNBs and beams for the given target CPE/FWA 324.

CPE/FWA Apparatus—

Figure 8:
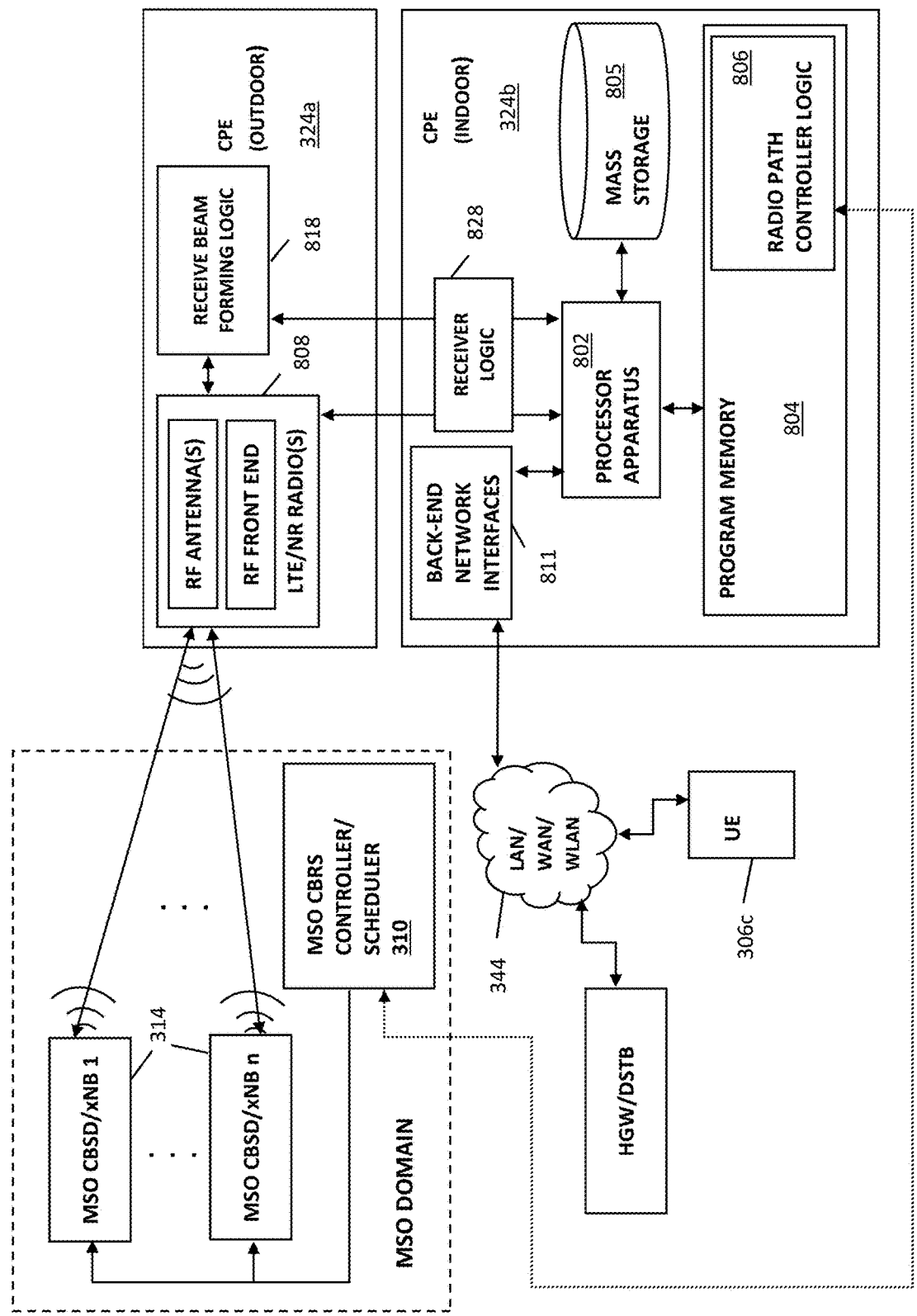
FIG. 8 is a functional block diagram illustrating one embodiment of an exemplary Consumer Premises Equipment (CPE) apparatus according to the present disclosure.
Figure 8A:
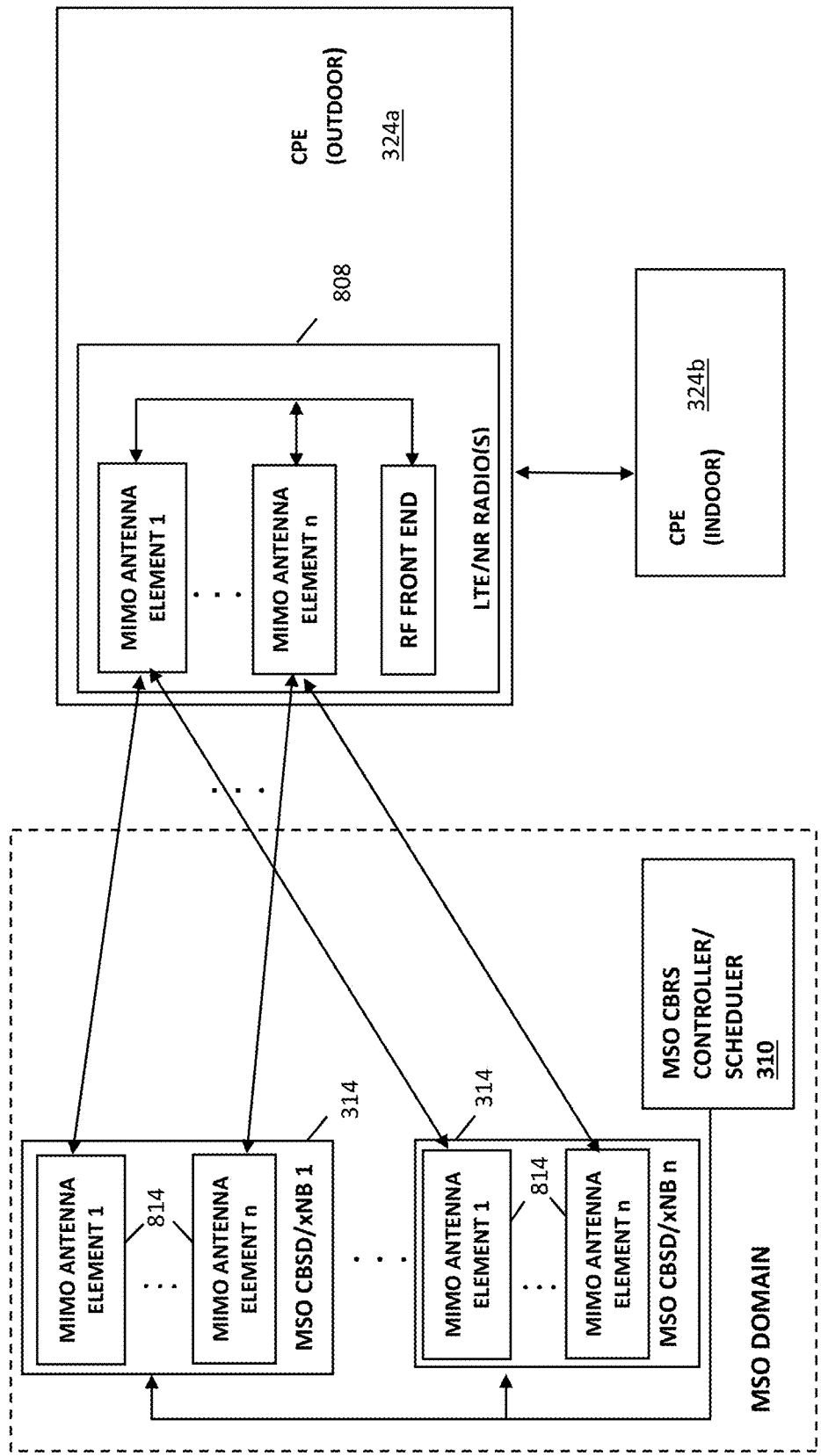
FIGS. 8a-8d are functional block diagrams illustrating various spatial diversity use cases/configurations according to some embodiments of the present disclosure.
Figure 8B:
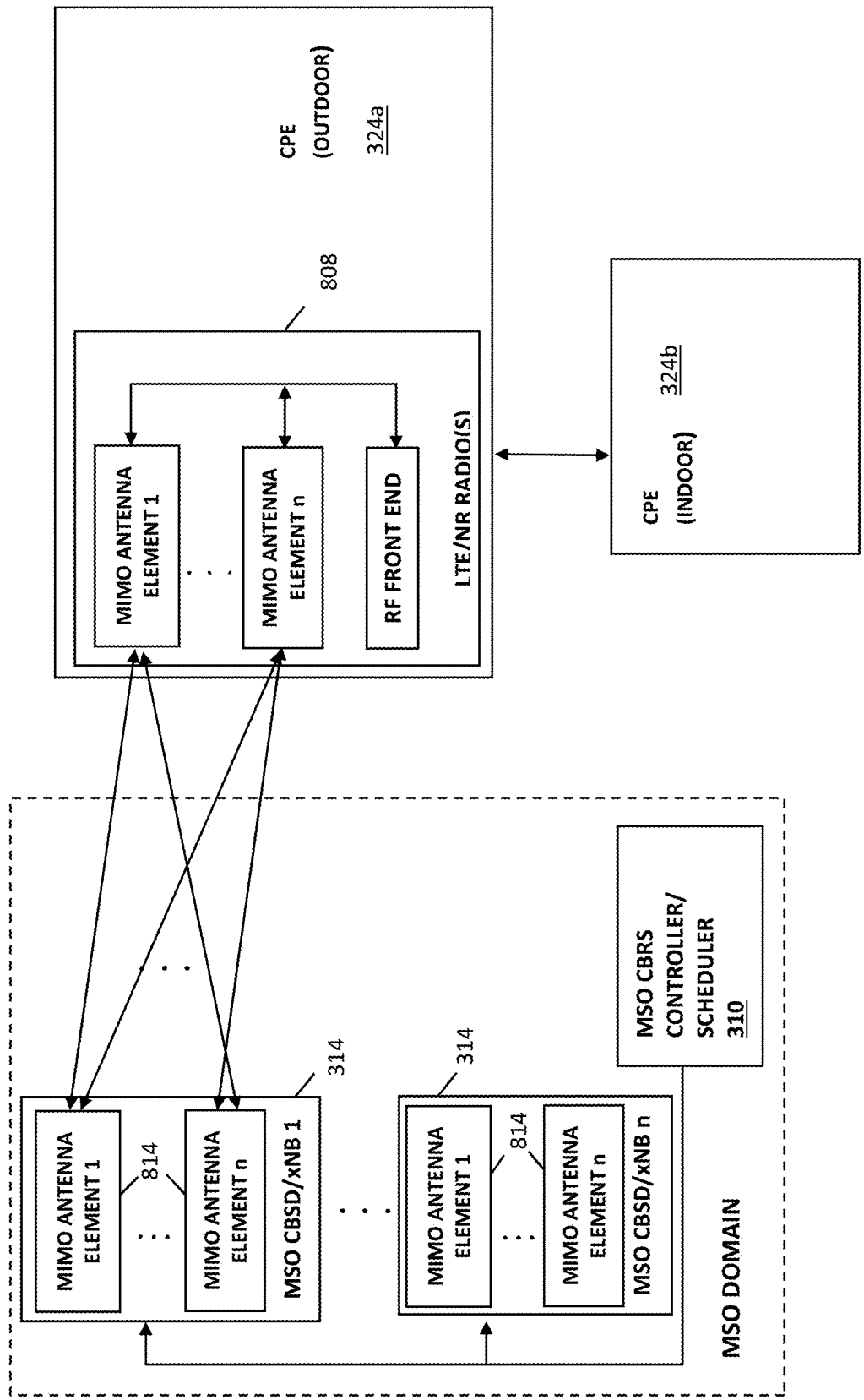
Figure 8C:
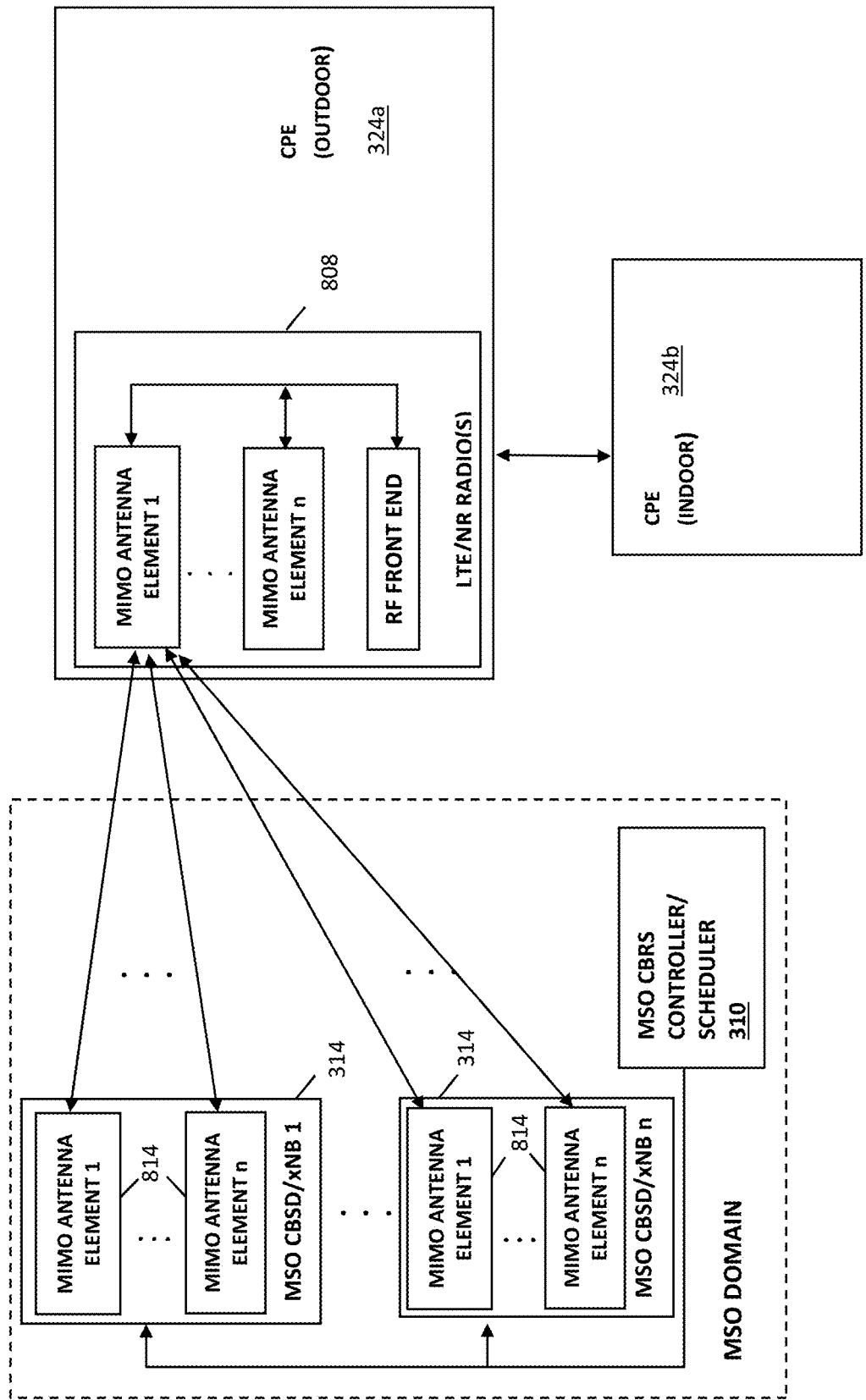
Figure 8D:
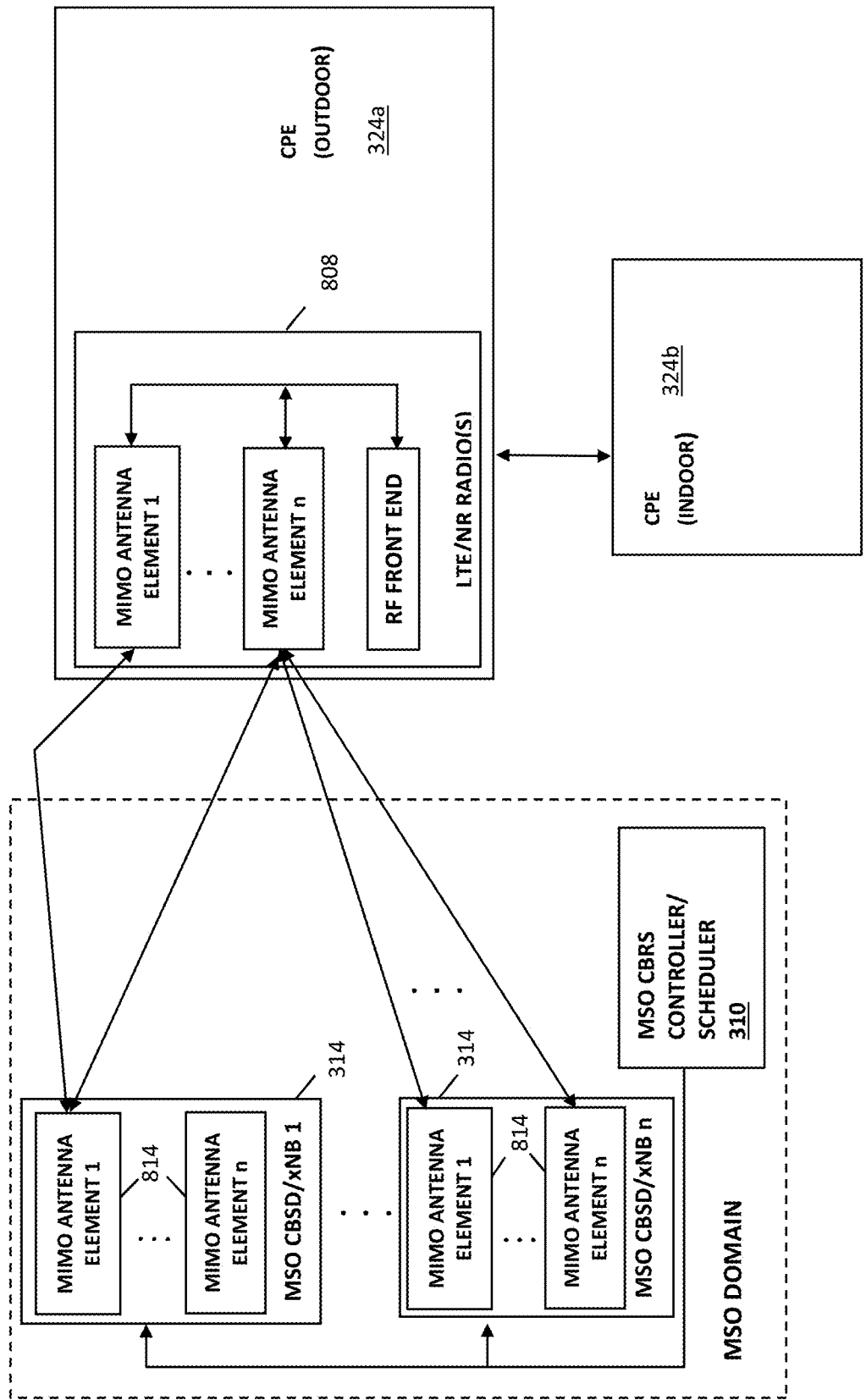

FIG. 8 illustrates an exemplary CPE 324 (e.g., FWA or other device) configured according to the present disclosure. As shown, the CPE/FWA 324 includes, inter alia, a processor apparatus or subsystem 802, a program memory module 804, mass storage 805, CPE controller logic module 806, one or more front end wireless network interfaces 808 for communication with e.g., CBSD/xNB, DP (if any), the MSO controller 310 and LAN, as well as one or more back end interfaces 811 such as for establishment of a WLAN AP within the served premises, Gigabit Ethernet or other LAN connectivity, support of home or premises gateways, DSTBs 344, UE's 306c etc. within the premises, etc., and for communicating with e.g., local equipment such as test/configuration devices or terminals.

At a high level, the CPE/FWA 324 includes two (2) sub-elements; i.e., an outdoor portion or radio head 324a, and an indoor or processing portion 324b. The radio head 324a in the exemplary embodiment includes each of the MIMO, MISO or other spatial diversity antenna elements (see FIGS. 8a-8d), as well as RF front end components necessary for receipt and processing of the signals, including logic to determine radio path parameters of interest such as amplitude/RSSI, phase, timing, as well as receive beam forming logic 818 (e.g., to form two or more discrete receive beams for among other things, spatial or azimuthal resolution of the signals received from the various CBSD/xNBs 314 in range of the CPE/FWA). As such, the RPC logic 806 (or the beam forming logic 818 itself) may "steer" the antenna array elements to evaluate or analyze particular azimuth values (which may be precoded into the logic, or fed from the network controller 310 dynamically) to scan and acquire RF signals of interest from the various CBSD/xNBs.

As indicated by its name, the CPE outdoor module or radio head 324 is typically disposed on a premises structure (e.g., rooftop, tower, utility pole, etc.) outdoors so as to minimize intervening interfering structures and RF signal attenuation as much as possible. The indoor unit 324*b* is in communication with the outdoor unit via e.g., interposed coaxial cable or other medium, and includes a CPE receiver unit 818 responsible for detecting and demodulating the received RF signals from different paths and combining them into one logical data stream (and converting to an appropriate protocol for distribution within the premises such as IEEE Std. 802.3 Ethernet packets. Combination of the received constituent signals (e.g., user data accessed via the assigned TDD slots and carrier(s) and beams) is accomplished in one embodiment via stream, CBSD/xNB and beam ID data (i.e., each stream of data from the different beam from a different contributing CBSD/xNB 314 will have unique ID data that can be used to temporally reconstruct the packet data associated with that stream in proper order and relation). In one variant, the cognizant network controller 310 (or a constituent CBSD/xNB) determines the division of a given input stream of user plane data across different beams, and this division can be reflected in data transmitted to the target CPE/FWA (e.g., as part of the command data previously described to instruct the CPE/FWA on slot timing, frequency and beams) for reconstruction of the user data into its original undivided form.

In the exemplary embodiment, the processor 802 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The processor 802 is configured to execute at least one computer program stored in memory 904 (e.g., a non-transitory computer readable storage medium); in the illustrated embodiment, such programs include logic to implement the RPC or radio path controller 333 functionality described previously herein. Other embodiments may implement such functionality within dedicated hardware, logic, and/or specialized co-processors (not shown).

The CBRS stack of the CPE is implemented and controlled via the RPC controller process (logic) 806 of the CPE 324 such that CBSD/xNB-to-CPE communication protocols are used to enable the RF detection and reporting, and scheduling/asset assignment data receipt functionality previously described, including CPE functions such as (i) generation and transmission of periodic, on-demand or ad hoc RF detection reports; (ii) receipt of network controller-generated TDD slot, carrier, and CBSD/xNB and wireless beam assignments. The logic 806 may also manage other aspects of CPE/FWA operation, including "intelligent" monitoring and storage of data for use in e.g., historical characterizations of the various CBSD/xNB in radio range of the CPE/FWA in terms of signal strength, signal stability, azimuth, receive beam configuration, and the like.

FIGS. 8*a*-8*d* are functional block diagrams illustrating various spatial diversity use cases/configurations according to some embodiments of the present disclosure. As shown, the present disclosure contemplates a variety of different CBSD/xNB, beam, and propagation path (i.e., direct/indirect multipath) combinations by which a given CPE/FWA 324 can receive multiple signals generated by the CBSD/xNBs, only a few of which are illustrated, but all of which will be appreciated by one of ordinary skill given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I

| | | | LTE frequency bands - TS 36.101 (Rel. 14 Jun. 2017) | | | | | | |
|---|---|---|---|---|---|---|---|---|---|
| | | Downlink (MHz) | | | Bandwidth | Uplink (MHz) | | | Duplex | Equivalent |
| Band | Name | Low | Middle EARFCN[1] | High | DL/UL (MHz) | Low | Middle EARFCN | High | spacing (MHz) | UMTS band |
| 1 | 2100 | 2110 0 | 2140 300 | 2170 599 | 60 | 1920 18000 | 1950 18300 | 1980 18599 | 190 | 1 |

APPENDIX I-continued

LTE frequency bands - TS 36.101 (Rel. 14 Jun. 2017)

| Band | Name | Downlink (MHz) Low | Downlink (MHz) Middle EARFCN[1] | Downlink (MHz) High | Bandwidth DL/UL (MHz) | Uplink (MHz) Low | Uplink (MHz) Middle EARFCN | Uplink (MHz) High | Duplex spacing (MHz) | Equivalent UMTS band |
|---|---|---|---|---|---|---|---|---|---|---|
| 2 | 1900 PCS | 1930 | 1960 | 1990 | 60 | 1850 | 1880 | 1910 | 80 | 2 |
|   |   | 600 | 900 | 1199 |   | 18600 | 18900 | 19199 |   |   |
| 3 | 1800+ | 1805 | 1842.5 | 1880 | 75 | 1710 | 1747.5 | 1785 | 95 | 3 |
|   |   | 1200 | 1575 | 1949 |   | 19200 | 19575 | 19949 |   |   |
| 4 | AWS-1 | 2110 | 2132.5 | 2155 | 45 | 1710 | 1732.5 | 1755 | 400 | 4 |
|   |   | 1950 | 2175 | 2399 |   | 19950 | 20175 | 20399 |   |   |
| 5 | 850 | 869 | 881.5 | 894 | 25 | 824 | 836.5 | 849 | 45 | 5 |
|   |   | 2400 | 2525 | 2649 |   | 20400 | 20525 | 20649 |   |   |
| 6 | UMTS only | 875 | 880 | 885 | 10 | 830 | 835 | 840 | 45 | 6 |
|   |   | 2650 | 2700 | 2749 |   | 20650 | 20700 | 20749 |   |   |
| 7 | 2600 | 2620 | 2655 | 2690 | 70 | 2500 | 2535 | 2570 | 120 | 7 |
|   |   | 2750 | 3100 | 3449 |   | 20750 | 21100 | 21449 |   |   |
| 8 | 900 GSM | 925 | 942.5 | 960 | 35 | 880 | 897.5 | 915 | 45 | 8 |
|   |   | 3450 | 3625 | 3799 |   | 21450 | 21625 | 21799 |   |   |
| 9 | 1800 | 1844.9 | 1862.4 | 1879.9 | 35 | 1749.9 | 1767.4 | 1784.9 | 95 | 9 |
|   |   | 3800 | 3975 | 4149 |   | 21800 | 21975 | 22149 |   |   |
| 10 | AWS-1+ | 2110 | 2140 | 2170 | 60 | 1710 | 1740 | 1770 | 400 | 10 |
|   |   | 4150 | 4450 | 4749 |   | 22150 | 22450 | 22749 |   |   |
| 11 | 1500 Lower | 1475.9 | 1485.9 | 1495.9 | 20 | 1427.9 | 1437.9 | 1447.9 | 48 | 11 |
|   |   | 4750 | 4850 | 4949 |   | 22750 | 22850 | 22949 |   |   |
| 12 | 700 a | 729 | 737.5 | 746 | 17 | 699 | 707.5 | 716 | 30 | 12 |
|   |   | 5010 | 5095 | 5179 |   | 23010 | 23095 | 23179 |   |   |
| 13 | 700 c | 746 | 751 | 756 | 10 | 777 | 782 | 787 | −31 | 13 |
|   |   | 5180 | 5230 | 5279 |   | 23180 | 23230 | 23279 |   |   |
| 14 | 700 PS | 758 | 763 | 768 | 10 | 788 | 793 | 798 | −30 | 14 |
|   |   | 5280 | 5330 | 5379 |   | 23280 | 23330 | 23379 |   |   |
| 17 | 700 b | 734 | 740 | 746 | 12 | 704 | 710 | 716 | 30 |   |
|   |   | 5730 | 5790 | 5849 |   | 23730 | 23790 | 23849 |   |   |
| 18 | 800 Lower | 860 | 867.5 | 875 | 15 | 815 | 822.5 | 830 | 45 |   |
|   |   | 5850 | 5925 | 5999 |   | 23850 | 23925 | 23999 |   |   |
| 19 | 800 Upper | 875 | 882.5 | 890 | 15 | 830 | 837.5 | 845 | 45 | 19 |
|   |   | 6000 | 6075 | 6149 |   | 24000 | 24075 | 24149 |   |   |
| 20 | 800 DD | 791 | 806 | 821 | 30 | 832 | 847 | 862 | −41 | 20 |
|   |   | 6150 | 6300 | 6449 |   | 24150 | 24300 | 24449 |   |   |
| 21 | 1500 Upper | 1495.9 | 1503.4 | 1510.9 | 15 | 1447.9 | 1455.4 | 1462.9 | 48 | 21 |
|   |   | 6450 | 6525 | 6599 |   | 24450 | 24525 | 24599 |   |   |
| 22 | 3500 | 3510 | 3550 | 3590 | 80 | 3410 | 3450 | 3490 | 100 | 22 |
|   |   | 6600 | 7000 | 7399 |   | 24600 | 25000 | 25399 |   |   |
| 23 | 2000 S-band | 2180 | 2190 | 2200 | 20 | 2000 | 2010 | 2020 | 180 |   |
|   |   | 7500 | 7600 | 7699 |   | 25500 | 25600 | 25699 |   |   |
| 24 | 1600 L-band | 1525 | 1542 | 1559 | 34 | 1626.5 | 1643.5 | 1660.5 | −101.5 |   |
|   |   | 7700 | 7870 | 8039 |   | 25700 | 25870 | 26039 |   |   |
| 25 | 1900+ | 1930 | 1962.5 | 1995 | 65 | 1850 | 1882.5 | 1915 | 80 | 25 |
|   |   | 8040 | 8365 | 8689 |   | 26040 | 26365 | 26689 |   |   |
| 26 | 850+ | 859 | 876.5 | 894 | 35 | 814 | 831.5 | 849 | 45 | 26 |
|   |   | 8690 | 8865 | 9039 |   | 26690 | 26865 | 27039 |   |   |
| 27 | 800 SMR | 852 | 860.5 | 869 | 17 | 807 | 815.5 | 824 | 45 |   |
|   |   | 9040 | 9125 | 9209 |   | 27040 | 27125 | 27209 |   |   |
| 28 | 700 APT | 758 | 780.5 | 803 | 45 | 703 | 725.5 | 748 | 55 |   |
|   |   | 9210 | 9435 | 9659 |   | 27210 | 27435 | 27659 |   |   |
| 29 | 700 d | 717 | 722.5 | 728 | 11 | Downlink only | | | | |
|   |   | 9660 | 9715 | 9769 |   |   |   |   |   |   |
| 30 | 2300 WCS | 2350 | 2355 | 2360 | 10 | 2305 | 2310 | 2315 | 45 |   |
|   |   | 9770 | 9820 | 9869 |   | 27660 | 27710 | 27759 |   |   |
| 31 | 450 | 462.5 | 465 | 467.5 | 5 | 452.5 | 455 | 457.5 | 10 |   |
|   |   | 9870 | 9895 | 9919 |   | 27760 | 27785 | 27809 |   |   |
| 32 | 1500 L-band | 1452 | 1474 | 1496 | 44 | Downlink only | | | | 32 |
|   |   | 9920 | 10140 | 10359 |   |   |   |   |   |   |
| 65 | 2100+ | 2110 | 2155 | 2200 | 90 | 1920 | 1965 | 2010 | 190 |   |
|   |   | 65536 | 65986 | 66435 |   | 131072 | 131522 | 131971 |   |   |
| 66 | AWS-3 | 2110 | 2155 | 2200 | 90/70 | 1710 | 1745 | 1780 | 400 |   |
|   |   | 66436 | 66886 | 67335 |   | 131972 | 132322 | 132671 |   |   |
| 67 | 700 EU | 738 | 748 | 758 | 20 | Downlink only | | | | |
|   |   | 67336 | 67436 | 67535 |   |   |   |   |   |   |
| 68 | 700 ME | 753 | 768 | 783 | 30 | 698 | 713 | 728 | 55 |   |
|   |   | 67536 | 67686 | 67835 |   | 132672 | 132822 | 132971 |   |   |
| 69 | 2500 | 2570 | 2595 | 2620 | 50 | Downlink only | | | | |
|   |   | 67836 | 68086 | 68335 |   |   |   |   |   |   |
| 70 | AWS-4 | 1995 | 2007.5 | 2020 | 25/15 | 1695 | 1702.5 | 1710 | 300 |   |
|   |   | 68336 | 68461 | 68585 |   | 132972 | 133047 | 133121 |   |   |

APPENDIX I-continued

LTE frequency bands - TS 36.101 (Rel. 14 Jun. 2017)

| Band | Name | Downlink (MHz) Low | Downlink (MHz) Middle EARFCN[1] | Downlink (MHz) High | Bandwidth DL/UL (MHz) | Uplink (MHz) Low | Uplink (MHz) Middle EARFCN | Uplink (MHz) High | Duplex spacing (MHz) | Equivalent UMTS band |
|---|---|---|---|---|---|---|---|---|---|---|
| 252 | Unlicensed NII-1 | 5150 255144 | 5200 255644 | 5250 256143 | 100 | | Downlink only | | | |
| 255 | Unlicensed NII-3 | 5725 260894 | 5787.5 261519 | 5850 262143 | 125 | | Downlink only | | | |
| | | | | | TDD | | | | | |
| 33 | TD 1900 | 1900 36000 | 1910 36100 | 1920 36199 | 20 | | | | | A(lo) |
| 34 | TD 2000 | 2010 36200 | 2017.5 36275 | 2025 36349 | 15 | | | | | A(hi) |
| 35 | TD PCS Lower | 1850 36350 | 1880 36650 | 1910 36949 | 60 | | | | | B(lo) |
| 36 | TD PCS Upper | 1930 36950 | 1960 37250 | 1990 37549 | 60 | | | | | B(hi) |
| 37 | TD PCS Center gap | 1910 37550 | 1920 37650 | 1930 37749 | 20 | | | | | C |
| 38 | TD 2600 | 2570 37750 | 2595 38000 | 2620 38249 | 50 | | | | | D |
| 39 | TD 1900+ | 1880 38250 | 1900 38450 | 1920 38649 | 40 | | | | | F |
| 40 | TD 2300 | 2300 38650 | 2350 39150 | 2400 39649 | 100 | | | | | E |
| 41 | TD 2500 | 2496 39650 | 2593 40620 | 2690 41589 | 194 | | | | | |
| 42 | TD 3500 | 3400 41590 | 3500 42590 | 3600 43589 | 200 | | | | | |
| 43 | TD 3700 | 3600 43590 | 3700 44590 | 3800 45589 | 200 | | | | | |
| 44 | TD 700 | 703 45590 | 753 46090 | 803 46589 | 100 | | | | | |
| 45 | TD 1500 | 1447 46590 | 1457 46690 | 1467 46789 | 20 | | | | | |
| 46 | TD Unlicensed | 5150 46790 | 5537.5 50665 | 5925 54539 | 775 | | | | | |
| 47 | TD V2X | 5855 54540 | 5890 54890 | 5925 55239 | 70 | | | | | |
| 48 | TD 3600 | 3550 55240 | 3625 55990 | 3700 56739 | 150 | | | | | |

[1]EUTRA Absolute RF Channel Number

What is claimed is:

1. A computerized method of operating a wireless network infrastructure comprising a fixed wireless receiver and at least two base stations, the computerized method comprising:
   detecting, via the fixed wireless receiver, at least two signals;
   evaluating the detected at least two signals to generate data relating to the at least two signals;
   transmitting the generated data to at least one network controller in data communication with the at least two base stations, the transmitted generated data being useful in the at least one network controller in scheduling transmission of the at least two signals;
   receiving the at least two signals at the fixed wireless receiver, the at least two signals transmitted by respective ones of the at least two base stations and corresponding to a common data stream; and
   utilizing the at least two signals to obtain the common data stream for use by a premises device in data communication with the fixed wireless receiver.

2. The computerized method of claim 1, wherein the at least two signals are transmitted within a frequency range between 3.550 and 3.700 GHz inclusive, and the at least two base stations comprise CBRS (Citizens Broadband Radio Service) compliant CBSDs (Citizens Broadband radio Service Devices).

3. The computerized method of claim 2, wherein the evaluating the detected at least two signals to generate the data relating to the at least two signals comprises evaluating the detected at least two signals with respect to signal strength and direction.

4. The computerized method of claim 1, wherein the transmitted generated data comprise data useful in the at least one network controller in selecting a subset of multiple input multiple output (MIMO) antenna elements associated with each of the at least two base stations for subsequent delivery of the common data stream.

5. The computerized method of claim 1, wherein the transmitting the generated data to the at least one network controller in data communication with the at least two base stations comprises transmitting the generated data in one or more data bursts via a prescribed reverse channel between the fixed wireless receiver and one of the at least two base stations.

6. The computerized method of claim 1, wherein the receiving the at least two signals at the fixed wireless receiver comprises receiving the at least two signals during a same time slot and on a same carrier frequency.

7. The computerized method of claim 1, wherein the receiving the at least two signals at the fixed wireless receiver comprises receiving the at least two signals during respective ones of at least two time slots and on a same carrier frequency.

8. The computerized method of claim 1, wherein the utilizing the at least two signals to obtain the common data stream comprises utilizing data (i) transmitted to the fixed wireless receiver, and (ii) indicating at least transmit beam and data stream identification data enabling re-assembly of the common data stream from the received at least two signals.

9. A computerized method of operating a wireless network infrastructure, the wireless network infrastructure comprising at least one fixed wireless receiver, the at least one fixed wireless receiver disposed at a different physical location than another fixed wireless receiver, and a plurality of base stations, each one of the plurality of base stations having a plurality of independent radio frequency (RF) transmit beams, the computerized method comprising:
  transmitting at least two signals to the at least one fixed wireless receiver, wherein the at least two signals:
    (i) are transmitted, within one or more temporal periods allocated to the at least one fixed wireless receiver, by a prescribed combination of (a) the plurality of base stations and (b) the plurality of independent RF transmit beams of each of the plurality of base stations; and
    (ii) correspond to a common data stream to be delivered to the at least one fixed wireless receiver;
  receiving the transmitted at least two signals at the at least one fixed wireless receiver; and
  combining the at least two signals received at the at least one fixed wireless receiver to generate the common data stream;
  receiving, from the at least one fixed wireless receiver, data relating to an amplitude and a phase of at least one of the received at least two signals;
  evaluating the received data relating to the amplitude and the phase to generate correction data for transmission to the at least one fixed wireless receiver from which the data relating to the amplitude and the phase was received; and
  transmitting the correction data to the at least one fixed wireless receiver for utilization thereby in correcting one or more of amplitude or phase associated with the received at least two signals.

10. The computerized method of claim 9, wherein the at least two signals are transmitted within a frequency range between 3.550 and 3.700 GHz inclusive, and the plurality of base stations comprise Category B CBRS (Citizens Broadband Radio Service) compliant CBSDs (Citizens Broadband radio Service Devices).

11. The computerized method of claim 9, wherein the computerized method enables increase in at least one of (i) coverage area, or (ii) maximum data rate at or below a prescribed BER (bit error rate) as compared to transmission of the common data stream from only one of the plurality of base stations.

12. The computerized method of claim 9, further comprising determining the prescribed combination of (a) the plurality of base stations and (b) the plurality of independent RF transmit beams of the each base station, the determining comprising:
  obtaining data relating to SNR (Signal-to-Noise Ratio) associated with each combination of (a) the plurality of base stations, and (b) the plurality of independent RF transmit beams of the each base station;
  ranking the each combination based at least on the obtained data; and
  selecting at least a highest ranked one of the combinations of (a) the plurality of base stations and (b) the plurality of independent RF transmit beams of the each base station.

13. The computerized method of claim 9, wherein the one or more temporal periods are allocated based on a TDD (time division duplex) system.

14. A computerized network apparatus for wireless delivery of data to at least one fixed wireless receiver apparatus having a computerized premises controller in data communication with the at least one fixed wireless receiver apparatus, the at least one fixed wireless receiver apparatus and the computerized premises controller disposed at a user premises, the computerized network apparatus comprising:
  a plurality of wireless base stations each comprising a plurality of multiple input multiple output (MIMO) antenna elements; and
  a computerized network controller in data communication with the plurality of wireless base stations and configured to establish data communication with the computerized premises controller, to enable selection of at least two of the plurality of wireless base stations for delivery of at least portions of a data stream to the at least one fixed wireless receiver apparatus;
  wherein the computerized network controller is further configured to communicate data with the computerized premises controller to enable selection of individual ones of transmit beams formed by the plurality of MIMO antenna elements for each of the at least two of the plurality of wireless base stations for the delivery of the at least portions of the data stream to the at least one fixed wireless receiver apparatus.

15. The computerized network apparatus of claim 14, wherein the plurality of wireless base stations are each operationally limited to a respective value of maximum EIRP (Equivalent Isotropic Radiated Power), and the at least one fixed wireless receiver apparatus comprises computerized logic configured to enable utilization of received ones of the transmit beams carrying the at least portions of the data stream so as to achieve an aggregated received power value higher than that achievable by any single one of the plurality of base stations transmitting at its maximum EIRP.

16. The computerized network apparatus of claim 14, wherein the data communicated to enable the selection of the individual ones of the transmit beams formed by the plurality of MIMO antenna elements comprise data relating to one or more parameters useful for assessment of a relative utility of one of the transmit beams as compared to another of the transmit beams.

17. The computerized network apparatus of claim 14, wherein the transmit beams are each uniquely identified by a combination of (i) first data relating to identification of the each wireless base station, and (ii) second data relating to identification of each of the transmit beams, so as to enable the selection of the individual transmit beams.

18. The computerized network apparatus of claim 14, wherein the selection of the individual ones of the transmit beams comprises a capped selection of a prescribed maximum number of the transmit beams, the prescribed maximum number determined based at least on data indicative of an incremental return in performance associated with each additional transmit beam available for selection.

19. The computerized network apparatus of claim 14, wherein the computerized network controller is further configured to communicate data with the computerized premises controller to enable correction of data relating to one or more parameters associated with the delivery of the at least portions of the data stream to the at least one fixed wireless receiver apparatus.

20. The computerized network apparatus of claim 14, wherein the delivery of the at least portions of the data stream to the at least one fixed wireless receiver apparatus comprises delivery of the at least portions of the data stream within one or more temporal periods allocated to the at least one fixed wireless receiver apparatus, by a prescribed combination of (a) each of the two or more of the plurality of wireless base stations, and (b) a plurality of independent radio frequency (RF) transmit beams of each of the two or more of the plurality of wireless base stations.

* * * * *